(12) United States Patent
Matsumoto

(10) Patent No.: US 7,974,451 B2
(45) Date of Patent: Jul. 5, 2011

(54) DIFFUSION WEIGHTED IMAGE PROCESSING APPARATUS AND RECORDING MEDIUM FOR RECORDING IMAGE ANALYSIS PROGRAM

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1094 days.

(21) Appl. No.: 11/688,305

(22) Filed: Mar. 20, 2007

(65) Prior Publication Data

US 2007/0223832 A1    Sep. 27, 2007

(30) Foreign Application Priority Data

Mar. 23, 2006    (JP) ................. 2006-081575

(51) Int. Cl.
*G06K 9/00* (2006.01)
*G06K 9/36* (2006.01)
*G06K 7/015* (2006.01)
*G09G 5/00* (2006.01)
*H04N 9/74* (2006.01)

(52) U.S. Cl. ........ 382/128; 382/287; 382/289; 345/629; 348/584; 250/557; 128/922

(58) Field of Classification Search .................... None
See application file for complete search history.

(56) References Cited

U.S. PATENT DOCUMENTS

| | | | |
|---|---|---|---|
| 2001/0007424 A1* | 7/2001 | Kabasawa et al. | 324/312 |
| 2005/0218893 A1* | 10/2005 | Kumai et al. | 324/309 |
| 2007/0182411 A1* | 8/2007 | Bammer et al. | 324/307 |

FOREIGN PATENT DOCUMENTS

| | | |
|---|---|---|
| JP | 9-173314 | 7/1997 |
| JP | 10-332645 | 12/1998 |
| JP | 2002-017707 | 1/2002 |

OTHER PUBLICATIONS

"Diffusion MRI", www.Wikipedia.com.*
Mangin, J.F., et al. "Eddy-Current Distortion Correction and Robust Tensor Estimation for MR Diffusion Imaging." MICCAI 2001, LNCS 2208, 4th International Conference Utrecht, The Netherlands, Oct. 14-17, 2001. pp. 186-194.
Mangin, J.F., et al. "Distortion Correction and Robust Tensor Estimation for MR Diffusion Imaging." Preprint submitted to Elsevier Science. Oct. 10, 2002. pp. 1-15.
Tanba Hajime, et al; "Image correction of diffusion-weighted image deformation-using 2 different phase direction to correct deformation", Japan Radiological Society 52th general assembly meeting draft Feb. 20, 2006.

* cited by examiner

*Primary Examiner* — Anand Bhatnagar
*Assistant Examiner* — Randolph Chu
(74) *Attorney, Agent, or Firm* — Dorsey & Whitney LLP

(57) ABSTRACT

It is an object to provide a diffusion weighted image processing apparatus or the like which can correct a distortion of a diffusion weighted image requiring smaller endurance on a patient in a diffusion weighted image processing method for correcting distortion of a diffusion weighted image. The diffusion weighted image processing apparatus has a correcting device which relatively corrects, with mutual reference among two or more diffusion weighted images having different directions of gradient field pulses during imaging, distortions occurring in the directions of the gradient field pulses during the imaging of the diffusion weighted images, the distortion being caused by the gradient field pulse of the diffusion weighted image.

20 Claims, 18 Drawing Sheets

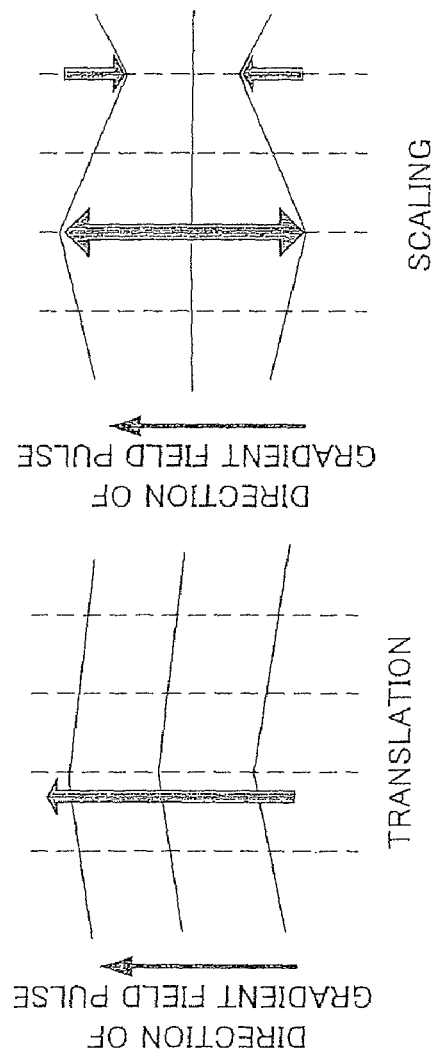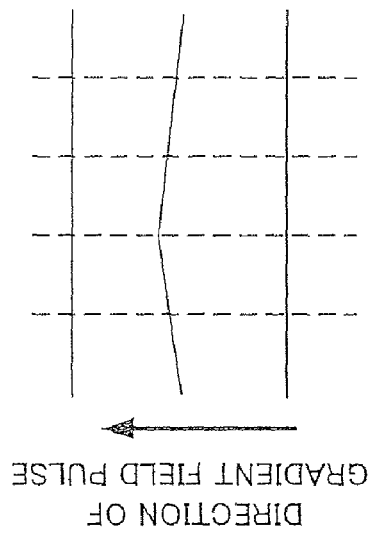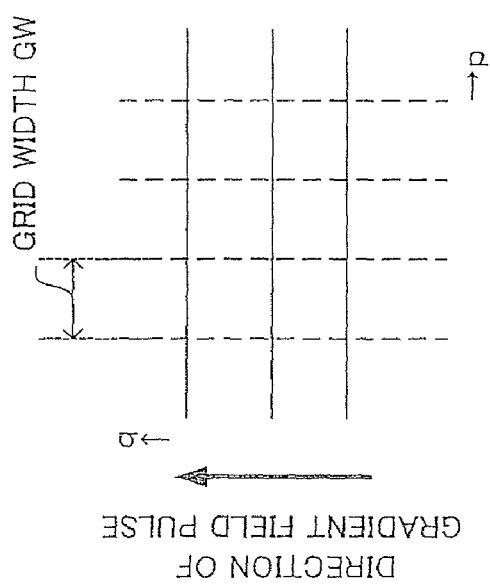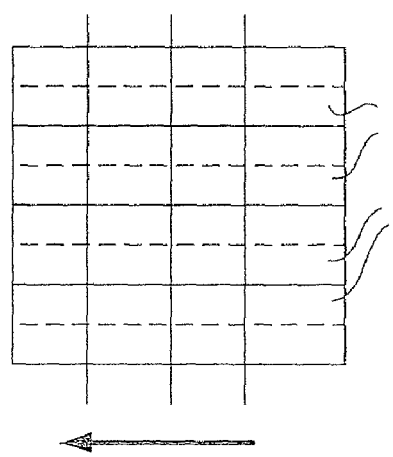
FIG. 8A
FIG. 8B TRANSLATION
FIG. 8C SCALING
FIG. 8D BAND LIKE REGION
FIG. 8E

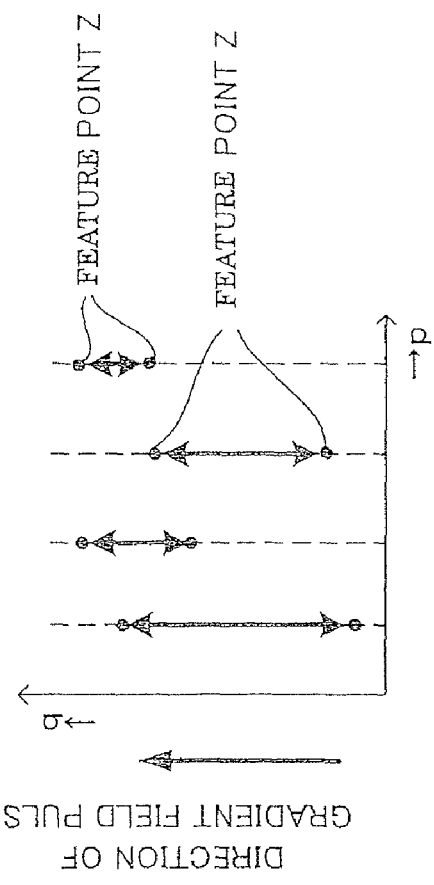
F I G. 9A
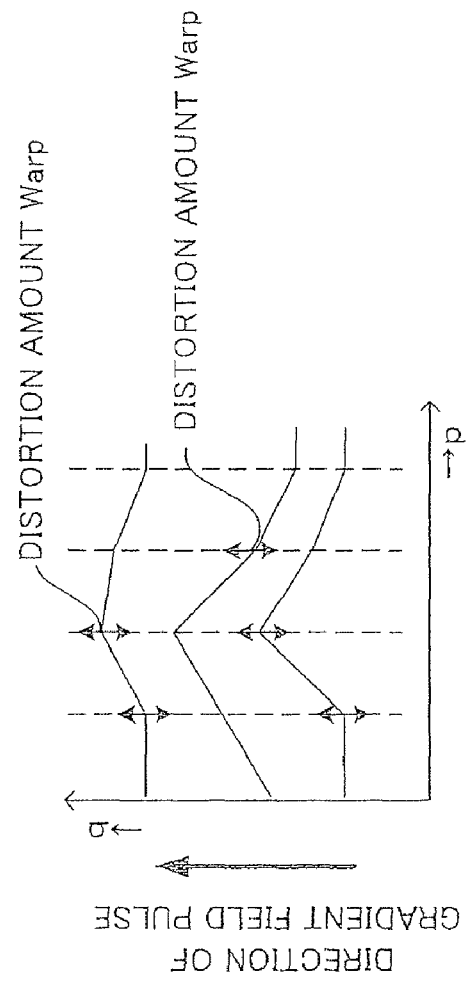
F I G. 9B

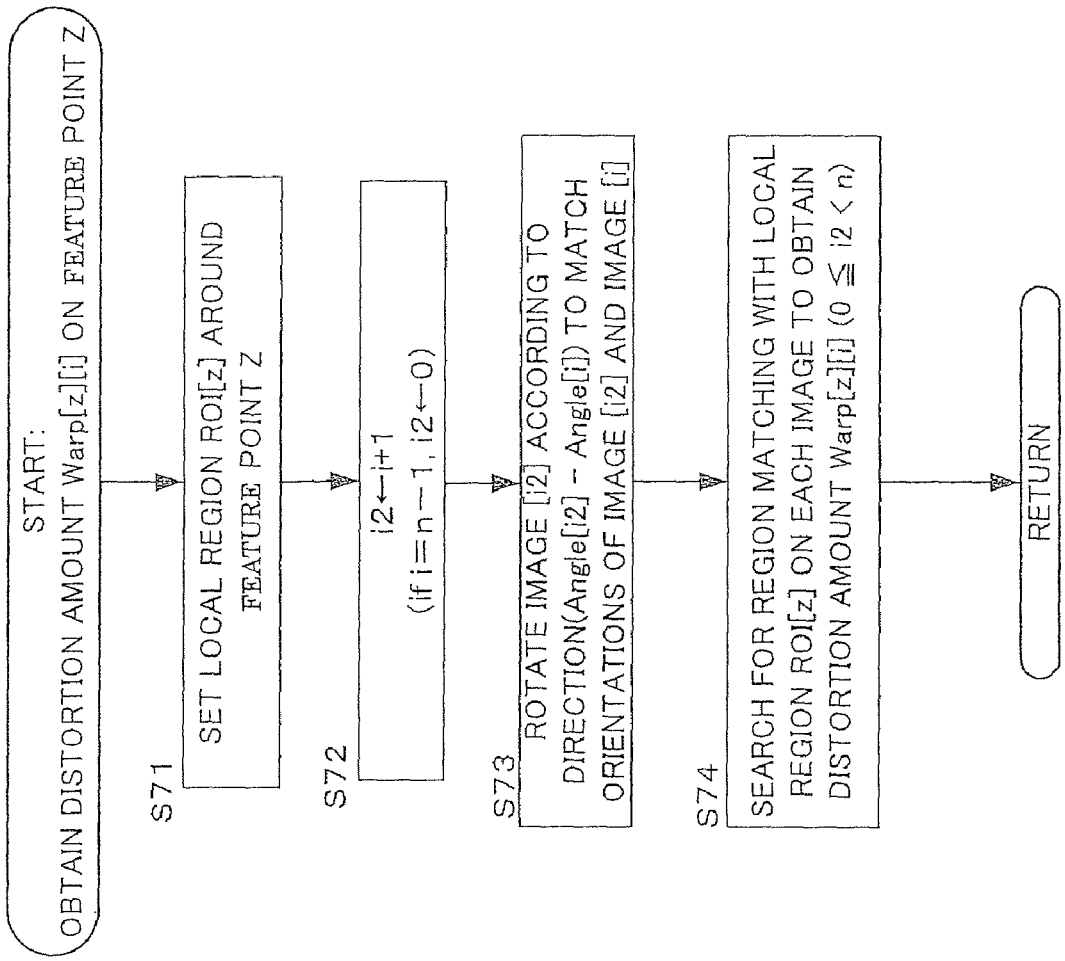

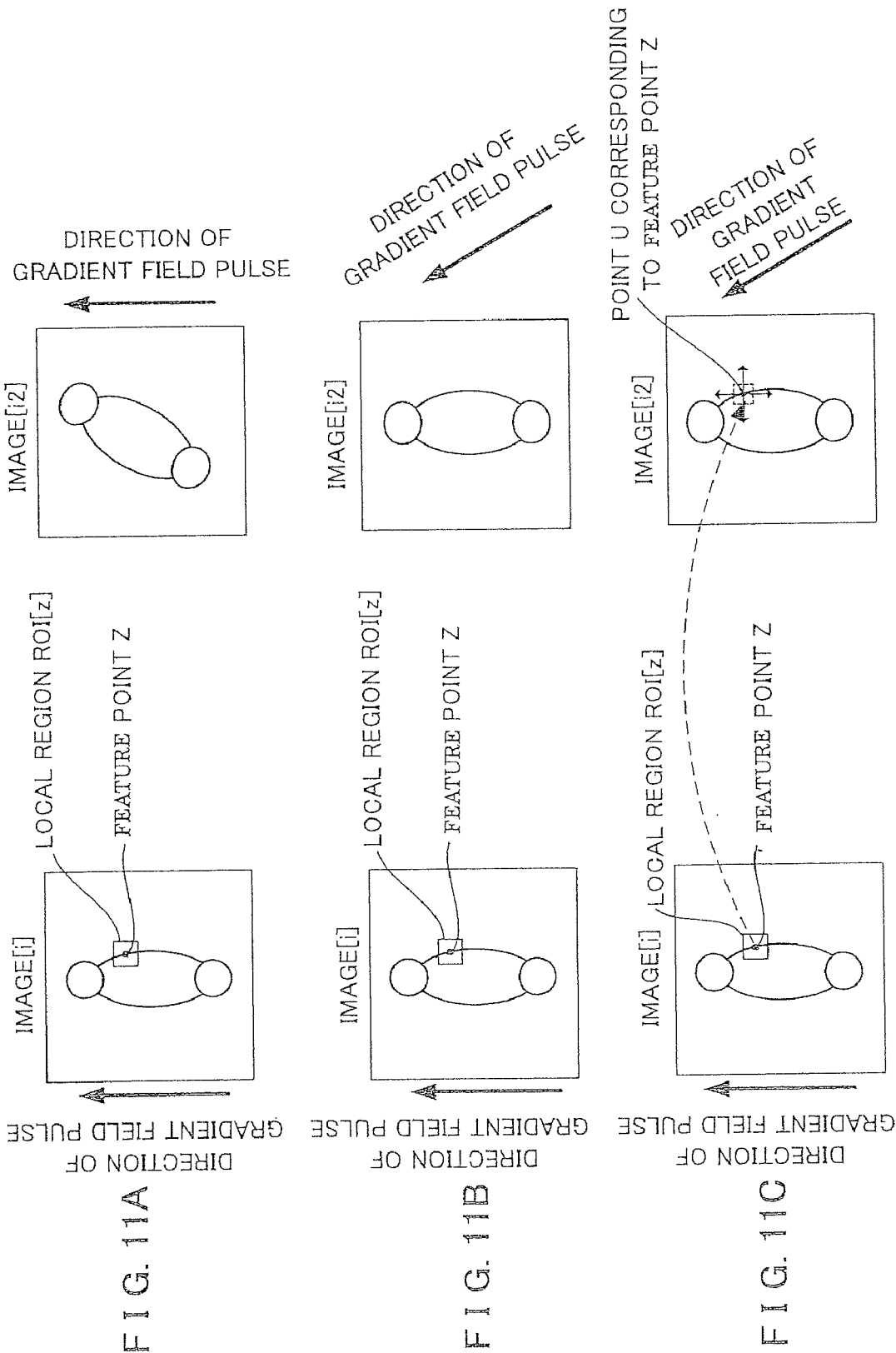

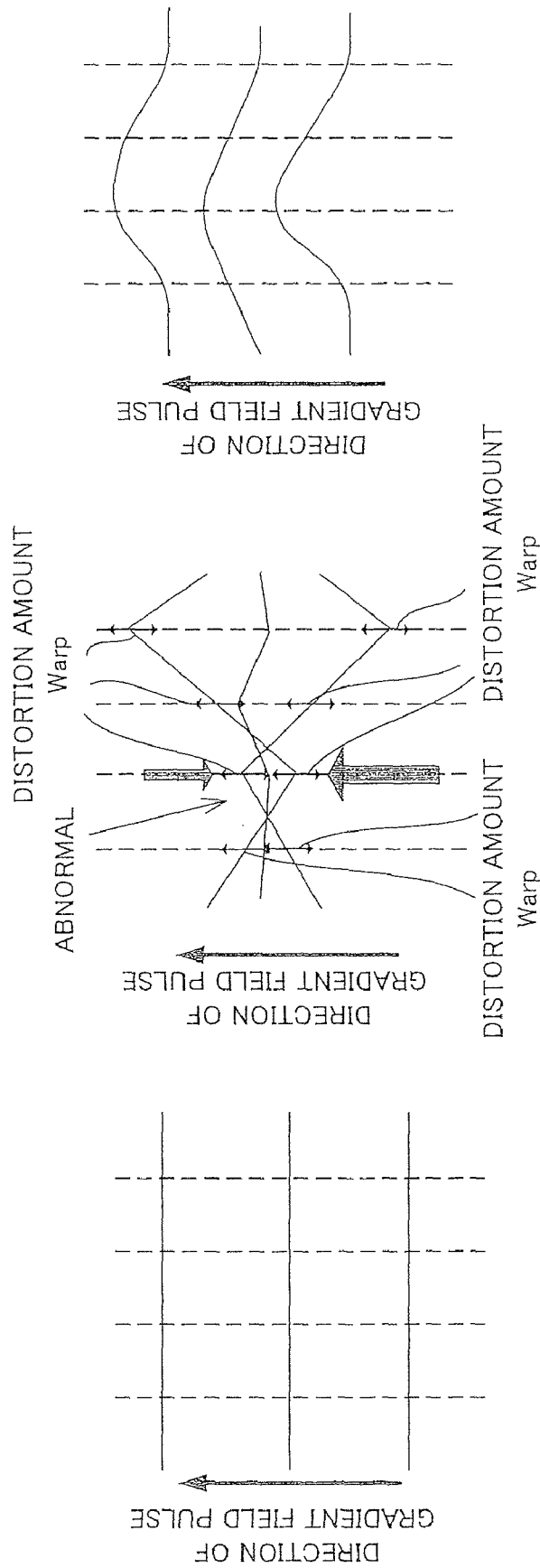

DIFFUSION WEIGHTED IMAGE PROCESSING APPARATUS AND RECORDING MEDIUM FOR RECORDING IMAGE ANALYSIS PROGRAM

TECHNICAL FIELD

The present invention relates to magnetic resonance imaging (MRI) using a magnetic resonance phenomenon of a nuclear spin in a patient, and particularly relates to diffusion imaging for obtaining an image with enhanced phase diffusion of a nuclear spin.

RELATED ARTS

In recent years, research and development of techniques relating to MRI apparatuses have been actively conducted. In an MRI apparatus, a nuclear spin of a patient placed in a static magnetic field is magnetically excited by a high-frequency signal of a Larmor frequency and an image is reconstructed or spectrum data is obtained based on an MR signal having been generated along with the excitation.

Imaging methods for MRI apparatuses include diffusion weighted imaging which is an imaging method for particularly enhancing Brownian movements of water molecules in tissue of a patient. As compared with conventional T1 weighted imaging and T2 weighted imaging, diffusion weighted imaging facilitates recognition of a state of water molecules and thus is used for imaging a nidus of a cerebral infarction, the running of cerebral nerve fibers and peripheral nerve fibers, tumors, and so on.

An image obtained by diffusion weighted imaging is called diffusion weighted image. And, the image is distorted by a direction of a gradient field pulse during image acquire.

To solve this problem, for example, "Eddy-Current Distortion Correction and Robust Tensor Estimation for MR diffusion Imaging" (J. F. Mangin, C. Poupon, C. Clark, D. Le Bihan, and I. Bloch, in 2001), and "Distortion Correction and Robust Tensor Estimation for MR diffusion Imaging" (J. F. Mangin, C. Poupon, C. Clark, D. LeBihan, and I. Bloch, 10 Oct. 2002), disclose a technique for correcting distortion of a diffusion weighted image by means of a reference image.

Further, in a diffusion weighted image, diffusion directions of enhanced water molecules are biased by directions of gradient field pulses during imaging, and thus features are enhanced with anisotropy. For this reason, conventionally two or more diffusion weighted images are photographed with different directions of gradient field pulse and the images are arranged for comparison during diagnosis.

However, in the case where two or more diffusion weighted images with different directions of gradient field pulse are arranged and compared with one another, a person as an observer has to recognize differences among the two or more images. In this case, it can be expected that a more precise diagnosis will be conducted by superimposing (fusion) two or more diffusion weighted images having been acquired with different gradient field pulses.

Incidentally, the above-described diffusion weighted imaging causes a long imaging time, which requires endurance to a patient. Although a shorter imaging time is required to minimize the endurance, the technique described in Non-Patent Document 1 requires an undistorted reference image during distortion correction and thus it is necessary to acquire two or more reference images of different imaging procedures. while acquiring reference images of different imaging procedures requires longer imaging time.

Moreover, the technique described in Non-Patent Document 1 excessively simplifies shearing distortion appearing on an image and thus causes inaccuracy.

The present invention is devised in consideration of the problems and can provide a diffusion weighted image processing apparatus or the like which can correct distortion of a diffusion weighted image with smaller endurance required on a patient in a diffusion weighted image processing method for correcting distortion of a diffusion weighted image.

SUMMARY OF THE INVENTION

The above object of the present invention, comprising a correcting device which relatively corrects, with mutual reference among two or more diffusion weighted images having different directions of gradient field pulses during imaging, distortions occurring in the directions of the gradient field pulses during the imaging of the diffusion weighted images, the distortion being caused by the gradient field pulse of the diffusion weighted image.

According to the present invention, even when the two or more diffusion weighted images are distorted during superimposition of the images, it is possible to correct distortion requiring smaller endurance on a patient.

In one aspect of the present invention, a computer is caused to act as the correcting device for relatively correcting distortions in directions of gradient field pulses during imaging of two or more diffusion weighted images, the diffusion weighted images being referred to each other with the different directions of the gradient field pulses during imaging, the distortions being caused by the gradient field pulses of the diffusion weighted images.

According to the present invention, even when the two or more diffusion weighted images are distorted during superimposition of the images, it is possible to correct distortion requiring smaller endurance on a patient.

As described above, according to the present invention, it is possible to provide a diffusion weighted image processing apparatus or the like which can correct distortion of a diffusion weighted image requiring smaller endurance on a patient.

BRIEF DESCRIPTION OF THE DRAWINGS

FIGS. 8A to 8E are explanatory drawings showing features of distortions of diffusion weighted images;

FIGS. 9A and 9B are explanatory drawings showing feature points;

FIG. 10 is a flowchart showing acquisition of distortion amounts Warp[z][i] on feature points Z1 and Z2 relative to each image;

FIGS. 11A to 11C are explanatory drawings showing acquisition of distortion amounts Warp [z][i] on the feature points Z1 and Z2 relative to each image;

FIGS. 13A to 13C are diagrams schematically showing an array of distortion amounts Warp[z][i] on each feature point Z;

BEST MODE FOR CARRYING OUT THE INVENTION

The following will describe preferred embodiments of the present invention in accordance with the accompanying drawings.

In a diffusion weighted image processing apparatus of the present embodiment, two or more diffusion weighted images (e.g., two to n images) with different gradient field pulses are captured. The images have been obtained by diffusion weighted imaging in which an MR signal generated from a patient laid on a bed is detected. The two or more diffusion weighted images are referred to each other to relatively correct distortions of the diffusion weighted images, and then a composite image is generated by superimposition (fusion).

Figure 1:
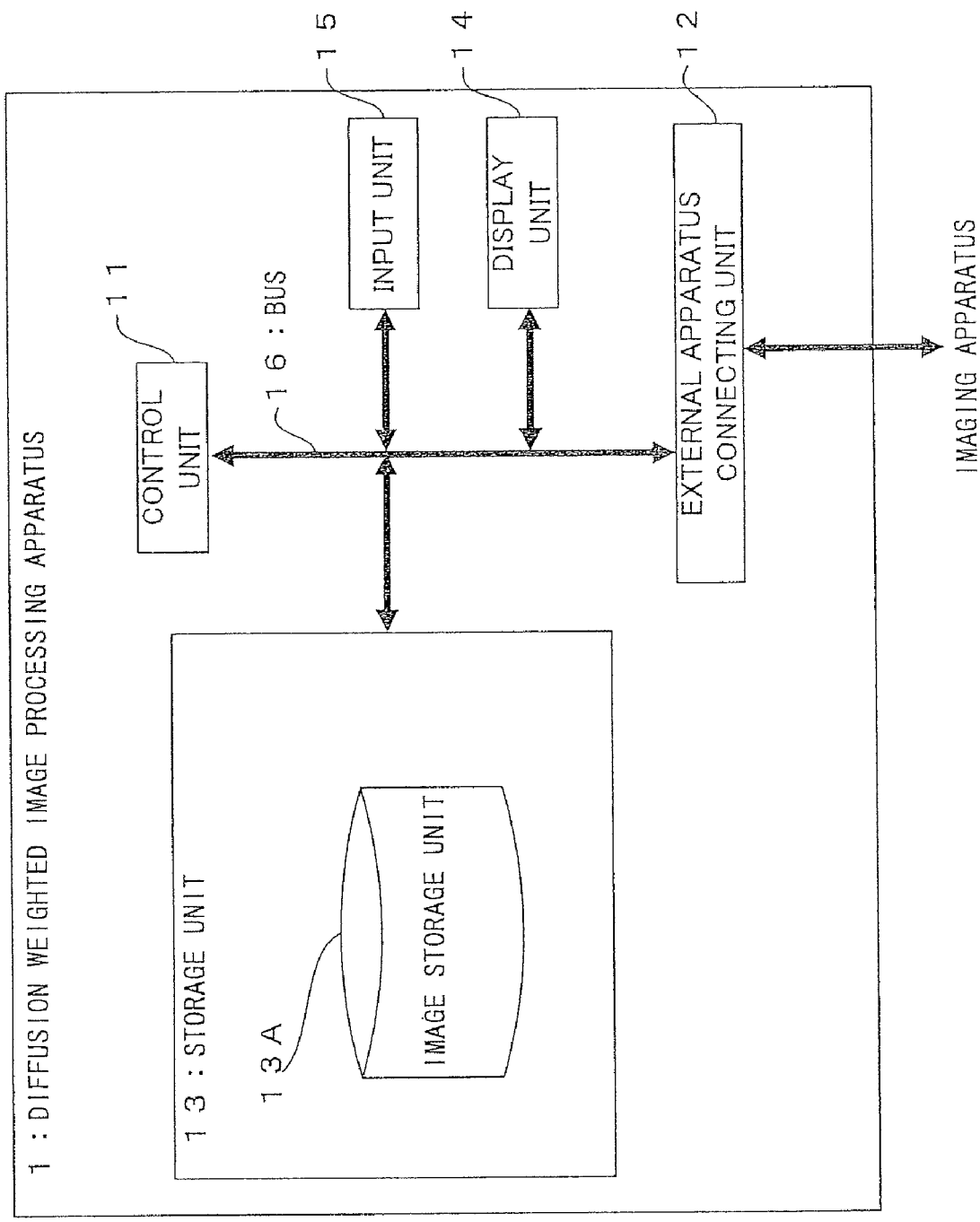
FIG. 1 is a block diagram showing the configuration of a diffusion weighted image processing apparatus of the present invention.

FIG. 1 is a block diagram showing the configuration of the diffusion weighted image processing apparatus of the present invention. As shown in FIG. 1, a diffusion weighted image processing apparatus 1 comprises a control unit 11 which includes a CPU (Central Processing Unit) as a computer having an arithmetic function, working RAM (Random Access Memory), and ROM (Read Only Memory) for storing various data and programs, an external apparatus connecting unit 12 which transmits various control signals to an imaging apparatus (not shown) and captures, as image data, diffusion weighted images having been acquired by the imaging apparatus into the processing apparatus (hereinafter "diffusion weighted image" will be simply referred to as "image"), a storage unit 13 which includes an image storage unit 13A for storing images having been captured into the processing apparatus through the external apparatus connecting unit 12, a display unit 14 acting as a display for displaying a composite image or the like having been generated by the diffusion weighted image processing apparatus 1, and an input unit 15 which provides various instructions during the correction of images or provides various input instructions for the imaging apparatus (not shown) through the diffusion weighted image processing apparatus 1. The control unit 11, the external apparatus connecting unit 12, the storage unit 13, the display unit 14, and the input unit 15 are connected to one another via a bus 16.

The control unit 11 comprises the CPU (not shown), the working RAM, the ROM for storing data and various programs such as an image processing program of the present invention, and an oscillator circuit. The control unit 11 generates, based on an operation signal from an operation unit (not shown), control information for controlling the components in order to implement operations corresponding to operation information included in the operation signal, and outputs the control information to the corresponding components through the bus 16 to control the operations of the components.

Further, the control unit 11 runs image processing programs stored in the ROM, the storage unit 13, or a storage medium such as a compact disc, so that the control unit 11 acts as a correcting device, a superimposing device, a first dividing device, a searching device, a second dividing device, a feature point determining device, a corresponding point obtaining device, and a feature point distortion amount obtaining device of the present invention in cooperation with the other components.

The external apparatus connecting unit 12 transmits an instruction signal to the imaging apparatus (not shown) according to serial method, USB method, IEEE1394, LAN method, or other proper methods.

In the present embodiment, the display unit 14 is included in the diffusion weighted image processing apparatus 1. A monitor or the like connected outside may be used as a display. In this case, a display control instruction signal is transmitted to a display such as a monitor through a video card, a VGA cable, a DVI cable, a BNC cable and so on included in the diffusion weighted image processing apparatus 1.

[Image Processing Steps]

With reference to the accompanying drawings, the following will discuss a specific image processing technique for superimposing (fusion) two or more images.

The technique of the present invention utilizes the following characteristic: an acquired image is distorted so as to be translated, sheared, and scaled up or down in a certain direction according to the direction of a gradient field pulse during the image acquiring. The distortion is caused by the direction of the gradient field pulse. To be specific, the technique utilizes a characteristic in which a straight line defined along the direction of a gradient field pulse is not changed by a distortion. Further, the technique utilizes a characteristic in which points on the straight line are displaced on the straight line by a distortion but the overall straight line is just translated and scaled up or down, and thus by determining the positions of two points on the straight line after the displacement, the other points on the straight line can be uniquely determined. Shearing can be represented by two or more straight lines distorted differently along one direction.

1. Embodiment 1 of Image Processing

Figure 2:
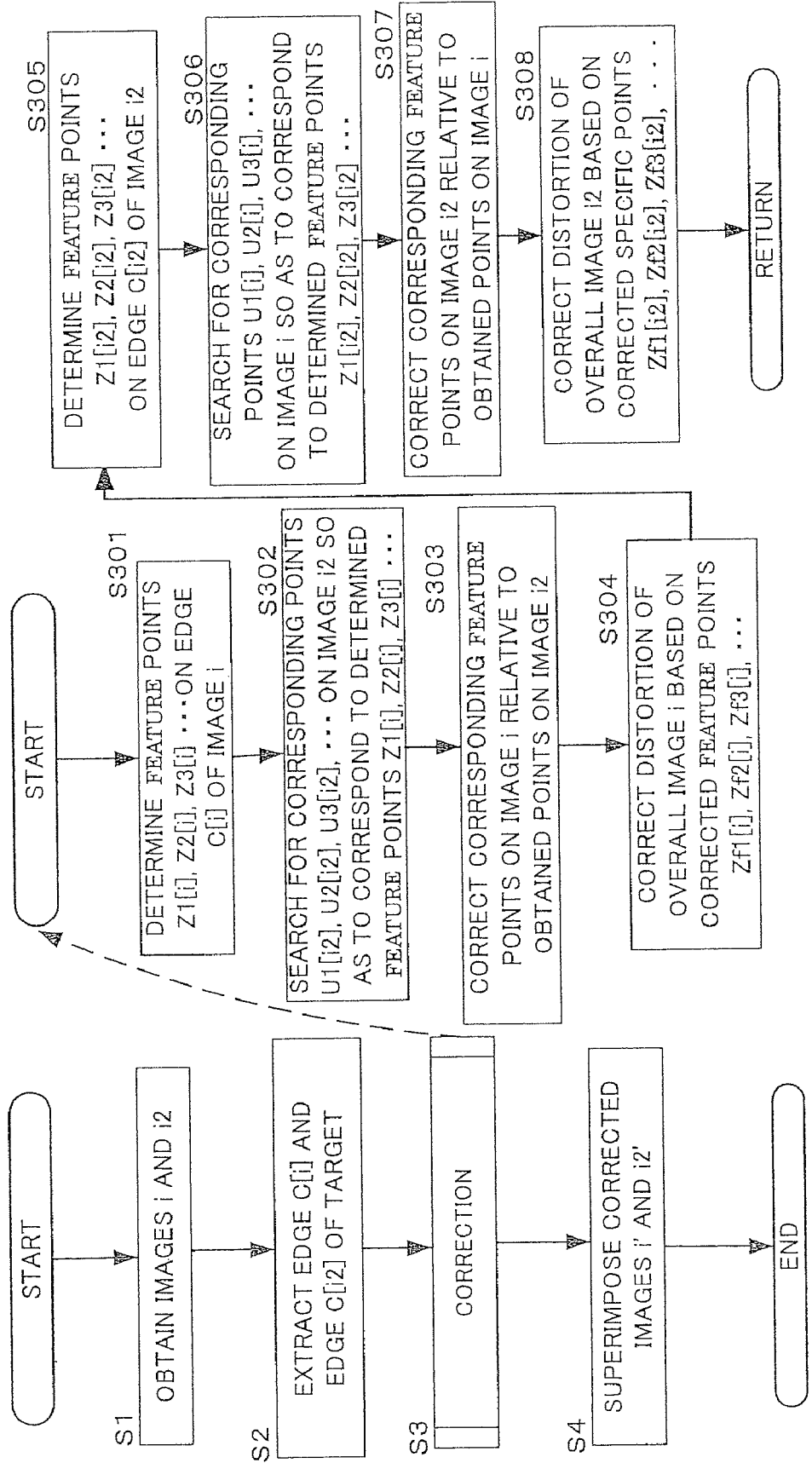
FIG. 2 is a flowchart showing image processing according to Embodiment 1 of image processing.

FIG. 2 is a flowchart showing image processing according to Embodiment 1 of image processing. This processing is performed when the control unit 11 of the diffusion weighted image processing apparatus 1 runs the image processing programs.

First, the control unit 11 obtains, from the image storage unit 13A, an image i and an image i2 to be superimposed (fusion) (step S1). For example, two or more images stored in the image storage unit 13A are displayed on the display unit 14 and an operator such as a doctor operates the input unit 15 to designate the image i and image i2 to be superimposed (fusion) from the displayed images.

Subsequently contours C[i] and C[i2] of a target are extracted from the obtained image i and image i2. The contours can be extracted using an existing method such as region growing method and level set method (step S2).

And then, the control unit 11 acts as the correcting device which corrects the images i and i2 while alternately referring to the images (Step S3).

Subsequently the process advances to correction. Correction in step S3 will be discussed below. In this example, the image i is corrected using the image i2 and a corrected image i' is obtained.

First, feature points $Z1[i], Z2[i], Z3[i], \ldots$ are determined based on the contour C1 of the target on the image i (step S301).

Figure 3:
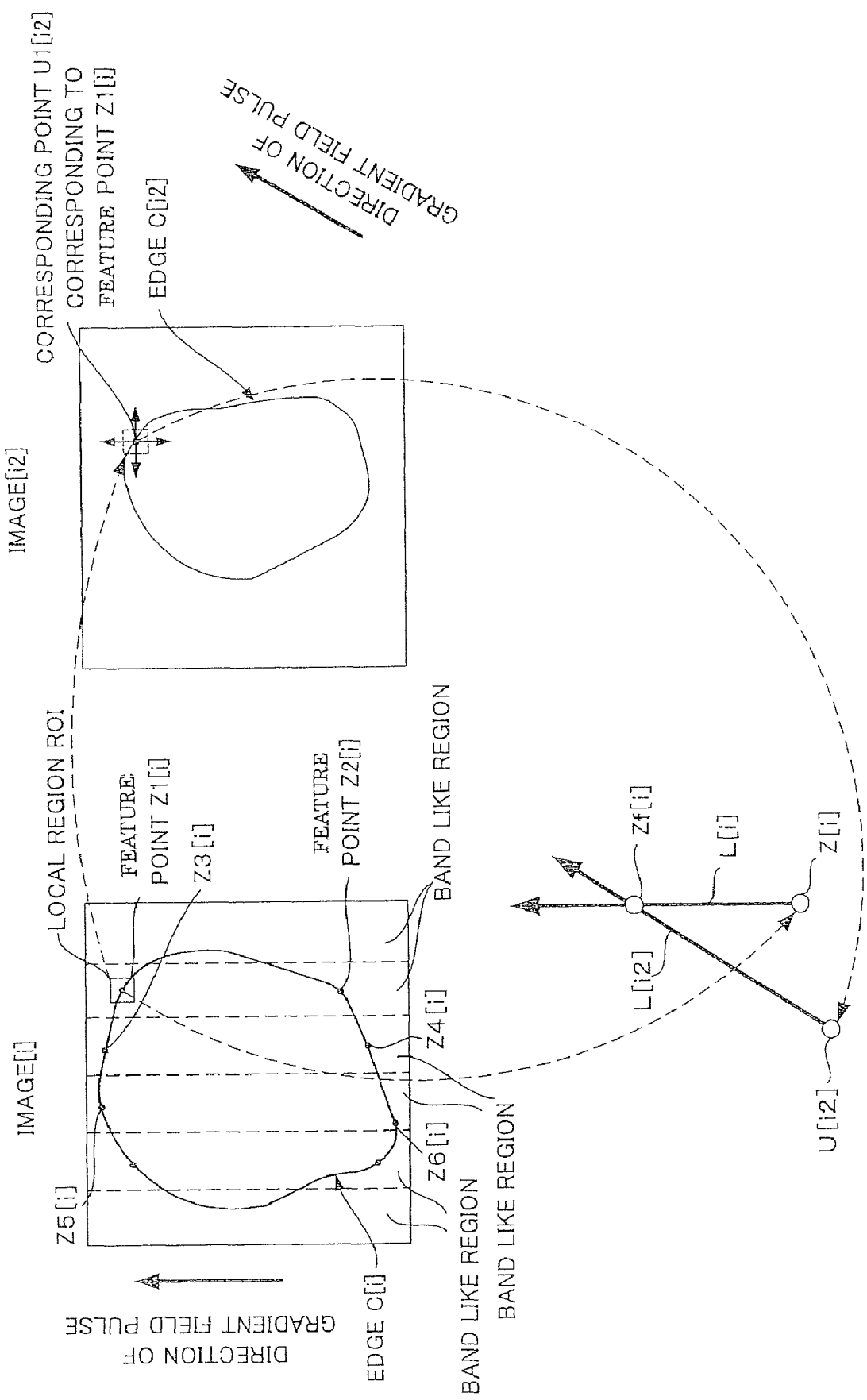
FIG. 3 is explanatory drawing showing a feature point determining approach.

A specific explanation will be given in accordance with the explanatory drawing of FIG. 3 showing the determination of the feature points.

First, when the image i is acquired, the control unit 11 acts as the second dividing device which divides the image i into two or more band like regions along a direction of a gradient field pulse. And then, the control unit 11 acts as the feature point determining device which determines two feature points Z on the contour C[i] for each band like region. Therefore the determined feature points Z are twice as many as the band like regions. Upon determination, the control unit 11 selects points of characteristic shapes which include a sharply bent contour of the target object, a sharp pointed contour, a point with a high curvature of contour, or a point where a curvature of contour largely changes.

Subsequently the control unit 11 acts as the corresponding point obtaining device which searches for and obtains, on the image i2, points corresponding to the determined feature points Z (step S302).

At this time, the control unit 11 searches locations (corresponding regions) where the most similar to regions (hereinafter will be referred to as "local regions ROI") around the feature points $Z1[i], Z2[i], Z3[i], \ldots$, so that the control unit 11 searches for, on the image i2, points $U1[i2], U2[i2], U3[i2] \ldots$ corresponding to the feature points $Z1[i], Z2[i], Z3[i], \ldots$.

During the search, a direction and a curvature of an contour on the feature point $Z1[i]$ are compared with those of an contour on the corresponding point $U1[i2]$. Further, pattern matching may be performed between the shape of an contour near the feature point $Z1[i]$ and the shape of an contour near the corresponding point $U1[i2]$. The pattern matching may be an evaluation of the similarity of the images. Moreover, the pattern matching may be performed after Fourier transformation or wavelet transformation.

In this way, the corresponding points are searched by comparing local regions in which distortion is negligible. Thus the corresponding points on the two images can be linked to each other. Further, during the search, it is efficient to start a search from a location having a same position coordinate on image i2 as the feature point Z.

Subsequently, with reference to the retrieved points $U1[i2], U2[i2], U3[i2]$ on the image i2, the corresponding feature points $Z1[i], Z2[i], Z3[i], \ldots$ on the image i are corrected (step S303).

As shown in FIG. 3, a position $Zf[i]$ corrected from the feature point $Z[i]$ on the image i can be determined by the directions of the gradient field pulses of the images i and i2.

To be specific, the position $Zf[i]$ corrected from the feature point $Z[i]$ on the image i can be determined as an intersection point of a straight line $L[i]$ passing through the feature point $Z[i]$ on the image i in parallel with the direction of the gradient field pulse of the image i and a straight line $L[i2]$ passing through the point $U[i2]$, which corresponds to the feature point $Z[i]$, on the image i2 in parallel with the direction of the gradient field pulse of the image i2.

In this way, with reference to the points $U1[i2], U2[i2], U3[i2] \ldots$ on the image i2, the corresponding feature points $Z1[i], Z2[i], Z3[i], \ldots$ on the image i are corrected.

Every two of the feature points $Z1[i], Z2[i], Z3[i], \ldots$ are determined for each of the band like regions divided along the gradient field pulse of image i and the feature points $Z1[i], Z2[i], Z3[i], \ldots$ are corrected using the image i2. The distortion of the overall image is corrected based on corrected feature points $Zf1[i] Zf2[i], Zf3[i], \ldots$ (step S304).

Since the image i is distorted along the direction of the gradient field pulse, points other than the feature points of the band like regions are interpolated so as to distribute a uniform distortion vector in each of the band like regions, based on the two corrected feature points which are feature points on one of the band like regions divided along the direction of the gradient field pulse. Thus the distortion of the overall image i is corrected and the corrected image can be obtained as the image i'.

And then, the image i2 is similarly corrected using the image i by the processing of step S305 to step S308, so that a corrected image i2' is obtained. The processing of step S305 to step S308 is similar to that of step S301 to step S304 and thus the explanation thereof is omitted.

And then, the control unit 11 acts as the superimposing device and the process advances to step S4 of the flowchart of FIG. 2. The control unit 11 superimposes (fusion) the corrected image i' and image i2' to generate a composite image, and the processing is completed (step S4).

In the above embodiment, when the images are corrected, two feature points are determined in each of the band like regions and interpolation is performed on the other points, so that the overall distortion is corrected. The number of feature points of the present invention is not particularly limited as long as two or more feature points are determined.

For a less characteristic band like region, a correction amount can be determined by interpolation relative to a band like region around the less characteristic band like region. It is self evident that an image is distorted along a direction of a gradient field pulse, and thus an overall distortion can be corrected using not less than two points in step S304.

According to the above embodiment, it is possible to correct distortions caused by gradient field pulses on images (diffusion weighted images) and obtain a composite image made up of a desired number of images (diffusion weighted images) requiring smaller endurance on a patient. Even in the case where the direction of the gradient field pulse is different in each of the images (diffusion weighted images) during imaging, it is possible to positively correct the images distorted in the directions of the gradient field pulses and generate a composite image in consideration of anisotropy resulted from the directions of the gradient field pulses of the images.

In a modification of the present embodiment, the control unit 11 acts as the first dividing device. The control unit 11 divides the images i and i2 into band like regions, divides each of the band like regions into two or more divided regions, and performs pattern matching to search for regions corresponding to each of the divided regions, so that a distortion is corrected for each of the divided regions.

The control unit 11 acts as the searching device. Regarding at least two of the divided regions included in each of the band like regions of the images, the corresponding regions on the other image are searched, a correction is made on each of the divided regions according to the directions of the gradient field pulses of the images i and i2 as in Embodiment 1, and then a correction is made, by using the divided regions after the correction, on the other regions of the band like region including the divided regions.

A size of the divided region is not particularly limited. For example, when the images i and i2 are about 256×256 pixels in size, each of the images is divided into regions of about 32×32 pixels.

The following configuration is also applicable: median filtering and Gaussian filtering are performed on the images, only distinctive divided regions are selected, and pattern matching is performed on the regions. Thus, it is possible to reduce a processing time of pattern matching. Moreover, the following configuration is applicable: of the two or more divided regions, only divided regions having distinctive points such as an contour are selected instead of uniform regions of a target, and pattern matching is performed only on the selected divided regions.

In the above embodiment, two images are corrected by making a reference alternately to the images and a composite image of the corrected images is generated. The above embodiment is also applicable to three or more images.

2. Embodiment 2 of Image Processing

Embodiment 2 of image processing will be discussed below. The present embodiment will describe a processing method in which no contours are extracted. To be specific, in Embodiment 1, a search is made for corresponding points by using the shapes of contours having been obtained by contour extraction, whereas in the present embodiment, a search is made by pattern matching for regions corresponding to divided regions of an image. This method is effective for an image whose contour is hard to extract and an image having a less distinctive contour. Further, two images are superimposed in Embodiment 1 of image processing, whereas three or more images are superimposed in the present embodiment.

Figure 4:
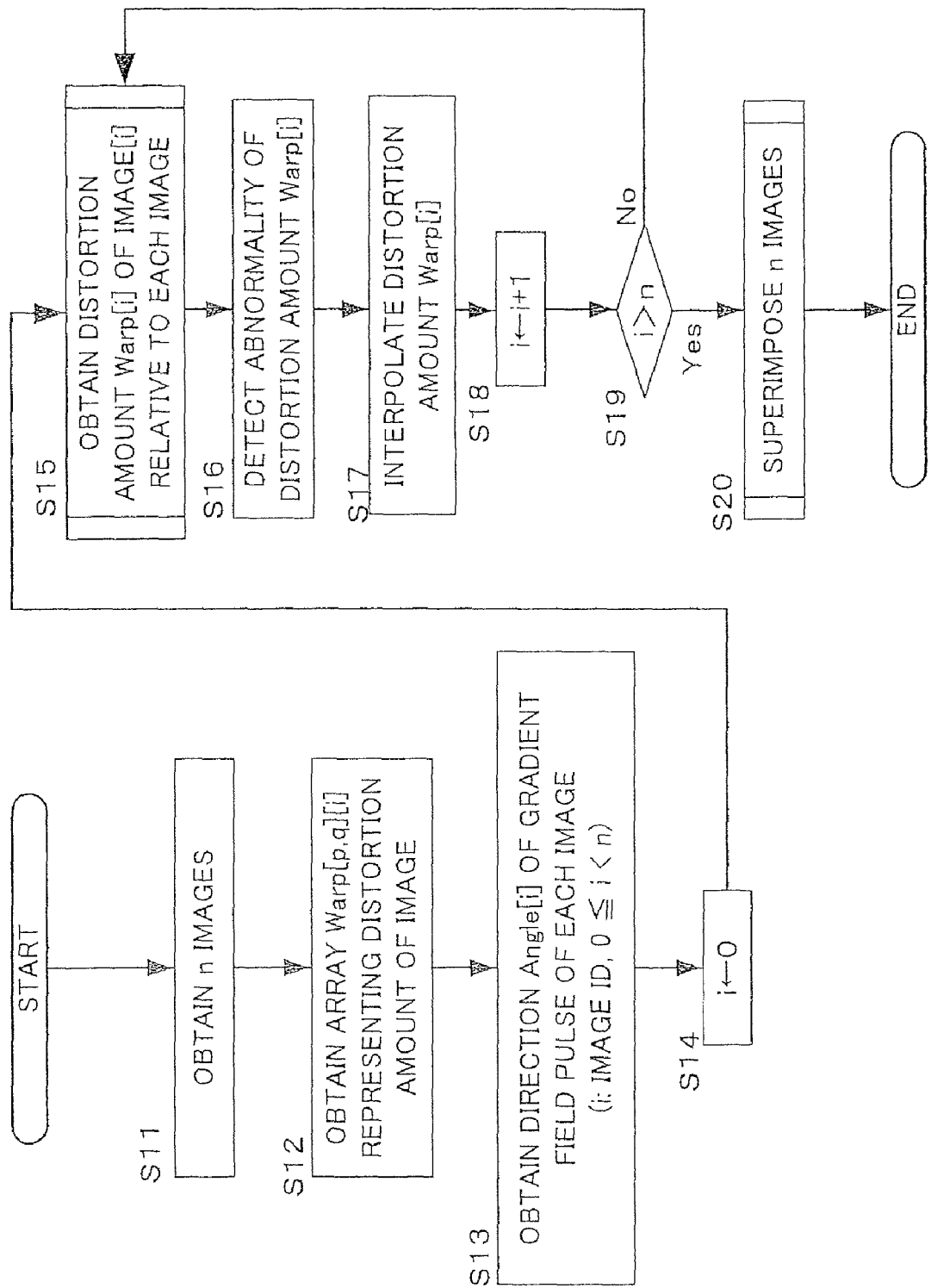
FIG. 4 is a flowchart showing image processing according to Embodiment 2 of image processing.

FIG. 4 is a flowchart showing image processing according to Embodiment 2 of image processing. The processing is performed when the control unit 11 of the diffusion weighted image processing apparatus 1 runs the image processing programs.

First, the control unit 11 obtains, from the image storage unit 13A, n images to be superimposed (fusion) (step S11). For example, two or more images stored in the image storage unit 13A are displayed on the display unit 14 and an operator such as a doctor operates the input unit 15 to designate n images to be superimposed (fusion) from the displayed images or designate and obtain all the n images having been acquired at the same time.

Subsequently an array Warp[p,q][i] representing a distortion amount of an image is obtained in RAM or the like (not shown) of the control unit 11 (step S12). i represents a unique image ID for uniquely identifying an image and is hereinafter used as a variable i ($0 \leq i < n$) for identifying an image. For example, when four images[i] (i=0, 1, 2, 3) are obtained in step s11 (n=4), an array Warp[p,q][0], an array Warp[p,q][1], an array Warp[p,q][2], and an array Warp[p,q][3] are obtained which represent distortion amounts of images. Further, an element Warp[p,q] of the array Warp[p,q][i] is a two-dimensional array having subscripts of p,q, which represents a value for identifying regions obtained by dividing a band like region on an image in a gridlike fashion. The value of Warp[p,q] represents a distortion amount of an indicated grid. In the present invention, the direction of a distortion is limited to the direction of a gradient field pulse, and thus the distortion amount can be represented not as a vector including a direction but as a scalar value.

And then, a direction Angle[i] of the gradient field pulse is obtained (step S13). The direction Angle[i] is an imaging condition of an image and is caused by a distortion to be corrected.

Subsequently the variable i is reset to 0 (step S14) and "acquisition of a distortion amount Warp[i]" of the image[i] is performed relative to each of the other images (step S15). To be specific, before an image[i] is superimposed on the other (n−1) images, a distortion amount is obtained relative to each of the other images with reference to the other images and the image[i] is corrected based on the distortion amount.

Before the overall image is corrected, abnormality detection is performed on the distortion amount Warp[i] having been obtained in step S15 (step S16) and interpolation is performed on the distortion amount Warp[i] (step 17). An unnatural portion of the obtained distortion amount Warp[i] is removed as an abnormal point and interpolation is performed in the direction of the gradient field pulse by using the obtained distortion amount Warp[i].

Subsequently the variable i is increased by 1 (step S18), it is decided whether the variable i is larger than the n images having been obtained in step S11 (step S19), and loop processing of step S15 to step S17 on all the obtained n images to obtain distortion amounts Warp[i] ($0 \leq i < n$) of each image relative to the other images. Thereafter, the control unit 11 acts as the superimposing device and performs "superimposition of n images", and the processing is completed (step S20).

"Acquisition of the distortion amount Warp[i]" in step S15, the abnormality detection and interpolation in step S16 and step S17, and "superimposition of n images" in step S20 will be specifically described later in accordance with the accompanying drawings including flowcharts.

2-1. Acquisition of Distortion Amount Warp[i]

Figure 5:
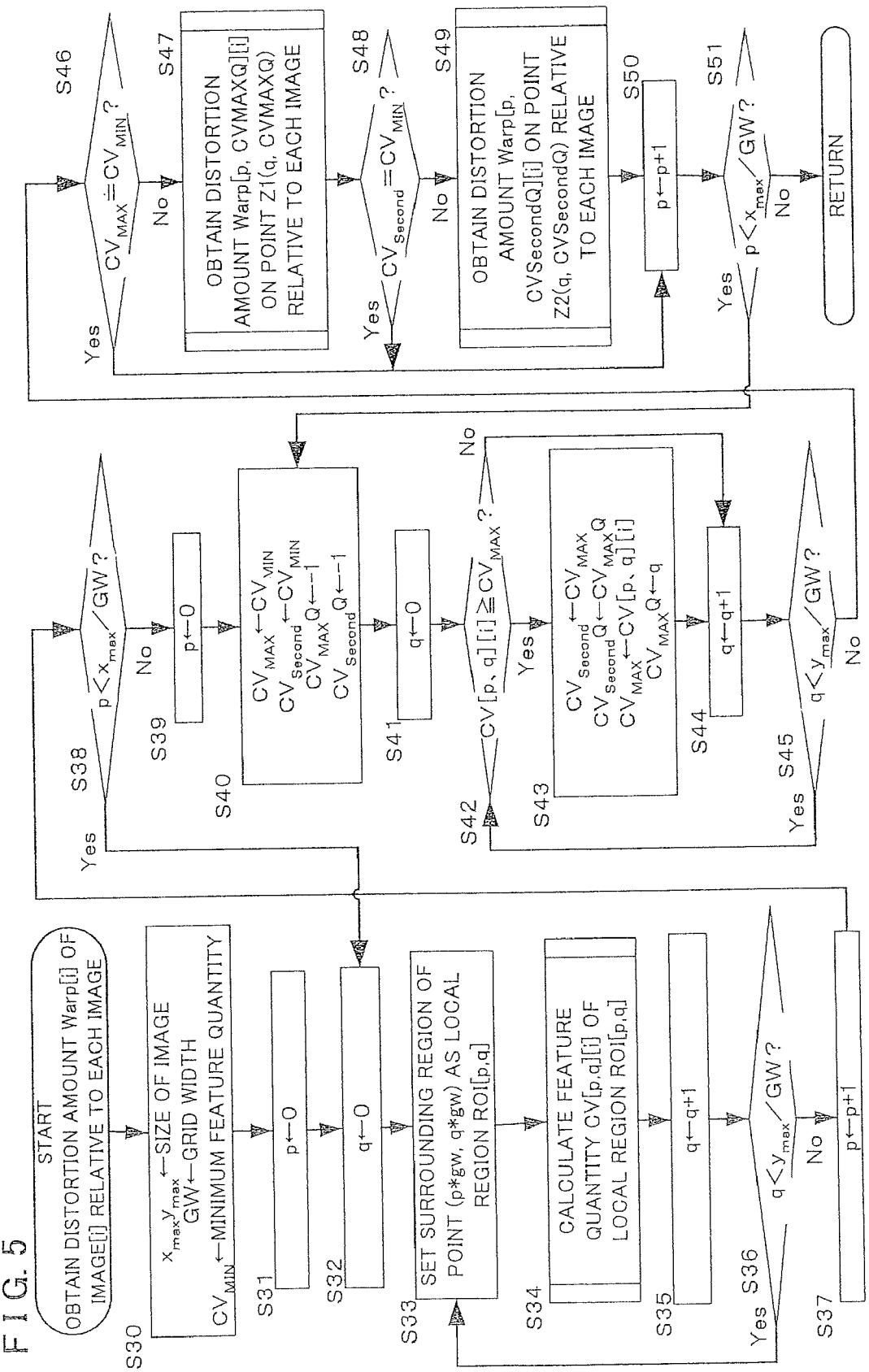
FIG. 5 is a flowchart showing acquisition of distortion amount Warp[i]

Referring to the flowchart of FIG. 5, the following will discuss "acquisition of the distortion amount Warp[i]" in step S15. In this case, the control unit 11 acts as the second dividing device, the feature point determining device, the corresponding point obtaining device, and the feature point distortion amount obtaining device.

The image[i] has a size of x_max and y_max. The image[i] is divided into two or more band like regions along the direction of the gradient field pulse. The image[i] has a grid width of GW when the band like region is further divided in a gridlike fashion. The minimum permissible value of the degree of contribution to pattern matching is defined as a minimum feature quantity CV_MIN. The pattern matching is performed to search for corresponding regions in each local region of the image[i] (step S30).

The size x_max and y_max of the image[i] is not particularly limited and is set at, for example, about 256×256 pixels. Also the grid width GW is not particularly limited and is set at, for example, about 64×64 pixels. In the following explanation, the direction of the gradient field pulse of the image[i] matches with the y-axis direction of the image.

And then, variables p and q for specifying a grid region on the image[i] are reset to 0 (steps S31 and S32) and a gw×gw size region surrounding a point (p*gw, q*gw) is set as a local region ROI[p,q] (step S33). When the size of the image[i] is 256×256 pixels and the grid width GW is 64×64 pixels, the grid region is 4×4=16 and the variables p and q range from 0 to 3.

Subsequently "calculation of the feature quantity CV[p,q][i] of the local region ROI[p,q]" is performed (step S34). The feature quantities CV[p,q][i] of the local regions ROI[p,q] on the image [i] are sequentially determined while the variables p and q for specifying regions on the image[i] are gradually increased as will be described later.

Figure 6:
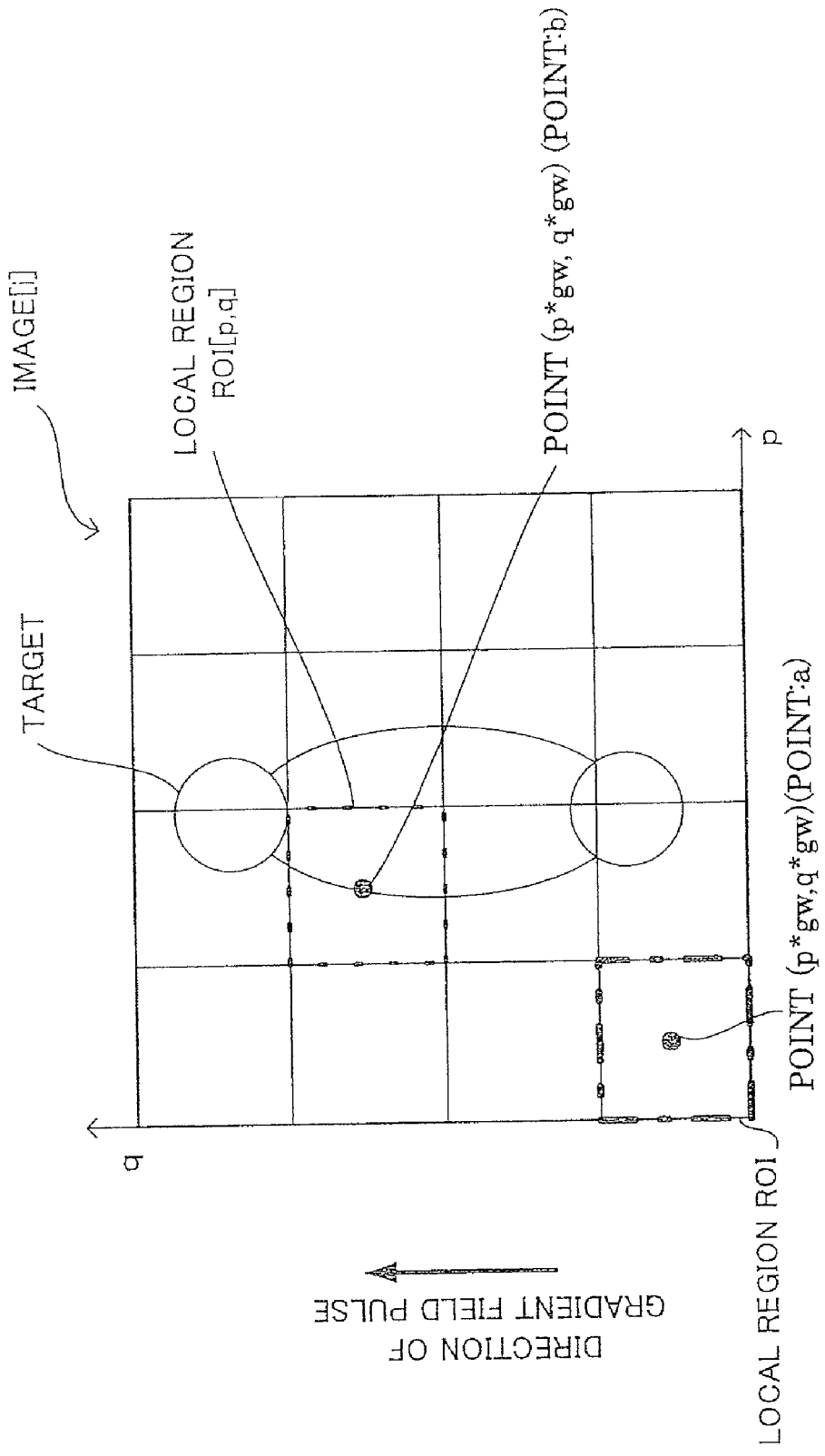
FIG. 6 is an explanatory drawing showing calculation of feature quantity CV[p,q] of local region ROI[p,q]

As shown in FIG. 6, a point (p*gw,q*gw) (point:a) on the lower left corner of the image[i] is set at the center of the local region ROI[p,q] (chain line frame) and the feature quantity CV[p,q][i] of the local region ROI[p,q] is calculated. However, no target exists on this location and thus this location does not contribute to pattern matching. Therefore, quite a small value is calculated as the feature quantity CV[p,q][i].

The feature quantity CV is a parameter indicating, in pattern matching discussed later, whether a valid pixel making up a distinctive point of the image is included or not. An area representing no features of an image, that is, an area (air) not including a target or a homogeneous area on the target has a low degree of contribution to pattern matching, so that the feature quantity CV is calculated as relatively a small value.

On the other hand, in a local region ROI[p,q] indicated by a dotted line frame in FIG. 6, the center of which is a point (p*gw, q*gw) (point:b), the feature quantity CV is calculated as relatively a large value since the local region includes a distinctive point of the image, for example, a point corresponding to an contour of a target. "Calculation of the feature quantity CV[p,q] of the local region ROI[p,q]" will be specifically described later in accordance with a flowchart.

Subsequently the variable q for specifying a region is increased by 1 (step S35) and it is decided whether the variable q is smaller than a value obtained by dividing, by the grid width GW, the image size y_max defined in step S30 (step S36). When the variable q is smaller (step S36: Yes), the process advances to step S33 to calculate a feature quantity CV[p,q][i] of another local region ROI[p,q] on the image[i].

In the decision of step S36, when the variable q for specifying a region is equal to or larger than a value obtained by dividing, by the grid width GW, the image size y_max defined in step S30 (step S36: No), the process advances to step S37.

Subsequently the variable p for specifying a region is increased by 1 (step S37) and it is decided whether the variable p is smaller than the value obtained by dividing, by the grid width GW, the image size x_max defined in step S30 (step S38). When the variable p is smaller (step S38: Yes), the process advances to step S32 to calculate a feature quantity CV[p,q][i] of another local region ROI[p,q] on the image[i] again.

In the decision of step S38, when the variable p is equal to or larger than the value obtained by dividing, by the grid width GW, the image size x_max defined in step S30 (step S38: No), the process advances to step S39.

And then, the variable p for specifying a region is reset to 0 (step S39), a maximum feature quantity CV_MAX and a second maximum feature quantity CV_Second are set at a minimum feature quantity CV_MIN defined in step S30, and the variable q of points having the maximum feature quantity CV_MAX and the second maximum feature quantity CV_Second (hereinafter referred to as "CV_MAXQ" and "CV_SecondQ", respectively) are defined as "−1" (step S40).

The maximum feature quantity CV_MAX and the second maximum feature quantity CV_Second are the maximum value and the second maximum value of the feature quantity CV[p,q] having been calculated in "calculation of the feature quantity CV[p,q] of the local region ROI[p,q]" in step S34. The points having the maximum feature quantity CV_MAX and the second maximum feature quantity CV_Second are feature points Z1 and Z2.

Subsequently the variable q for specifying a region is reset to 0 (step S41) and it is decided whether the feature quantity CV[p,q][i] of the local region ROI[p,q] on the image[i] is equal to or larger than the maximum feature quantity CV_MAX (step S42). When the feature quantity CV[p,q][i] is equal to or larger than the maximum feature quantity CV_MAX (step S42: Yes), the process advances to step S43.

When the feature quantity CV[p,q][i] is smaller than the maximum feature quantity CV_MAX (step S42: No), the process advances to step S44.

In step S43, the second maximum feature quantity CV_Second is defined as the maximum feature quantity CV_MAX, CV_SecondQ is defined as CV_MAXQ, the maximum feature quantity CV_MAX is defined as the feature quantity CV[p,q][i] of the local region ROI[p,q] on the image [i], and CV_MAXQ is defined as the variable q for specifying a currently noticed region (step S43).

In step S44, the variable q for specifying a region is increased by 1 (step S44) and then it is decided whether the variable q is smaller than the value obtained by dividing, by the grid width GW, the image size y_max defined in step S30 (step S45). When the variable q is smaller (step S45: Yes), the process advances to step S42 and it is decided whether a feature quantity CV[p,q][i] of the local region ROI[p,q] on the image[i] is equal to or smaller than the maximum feature quantity CV_MAX.

In the decision of step S45, when the variable q is equal to or larger than the value obtained by dividing, by the grid width GW, the image size y_max defined in step S30 (step S45: No), the process advances to step S46 and it is decide whether the maximum feature quantity CV_MAX is smaller than the minimum feature quantity CV_MIN (step S46).

As a result of the decision, when the maximum feature quantity CV_MAX is equal to the minimum feature quantity CV_MIN (step S46: Yes), feature quantity of the feature point Z1 is smaller than the permissible range. Thus the distortion amount Warp is not obtained and the process advances to step S50. The second maximum feature quantity CV_Second of the corresponding feature point Z2 is obviously equal to or smaller than the maximum feature quantity CV_MAX and thus the decision of step S48 is not necessary. When the maximum feature quantity CV_MAX is not equal to the minimum feature quantity CV_MIN (Step S46: No), that is, when the maximum feature quantity CV_MAX is larger than the minimum feature quantity CV_MIN, "acquisition of the distortion amount Warp[p,CV_MAXQ][i] on the point Z1(p, CV_MAXQ) relative to each image" is performed (step S47) to obtain the distortion amount of the feature point Z1.

And then, it is decided whether the second maximum feature quantity CV_Second is equal to the minimum feature quantity CV_MIN (step S48). When the second maximum feature quantity CV_Second is equal to the minimum feature quantity CV_MIN (step S48: Yes), the feature quantity of the feature point Z2 is smaller than the permissible range. Thus the distortion amount Warp is not obtained and the process advances to step S50.

When the second maximum feature quantity CV_Second is not equal to the minimum feature quantity CV_MIN (Step S48: No), that is, when the second maximum feature quantity CV_Second is larger than the minimum feature quantity CV_MIN, "acquisition of the distortion amount Warp [p, CV_SecondQ][i] on the point Z2(p,CV_SecondQ) relative to each image" is performed (step S49) to obtain the distortion amount of the feature point Z2. "Acquisition of the distortion amounts Warp on the points Z1 and Z2" in steps S47 and S49 will be specifically described later in accordance with a flowchart.

And then, the variable p for specifying a region is increased by 1 (step S50) and it is decided whether the variable p is smaller than the value obtained by dividing, by the grid width GW, the image size x_max defined in step S30 (step S51). When the variable p is smaller (step S51: Yes), the process advances to step S40 and distortion amounts Warp on the feature points Z1 and Z2 are obtained again.

In the decision of step S51, when the variable p is equal to or larger than the value obtained by dividing, by the grid width GW, the image size x_max defined in step S30 (step S51: No), distortion amounts Warp have been obtained on the feature points Z1 and Z2 having feature quantities larger than the minimum feature quantity CV_MIN in each band like region. Thus the processing is completed.

2-1-1 "Calculation of the Feature Quantity CV[p,q] of the Local Region ROI[p,q]"

Figure 7A:
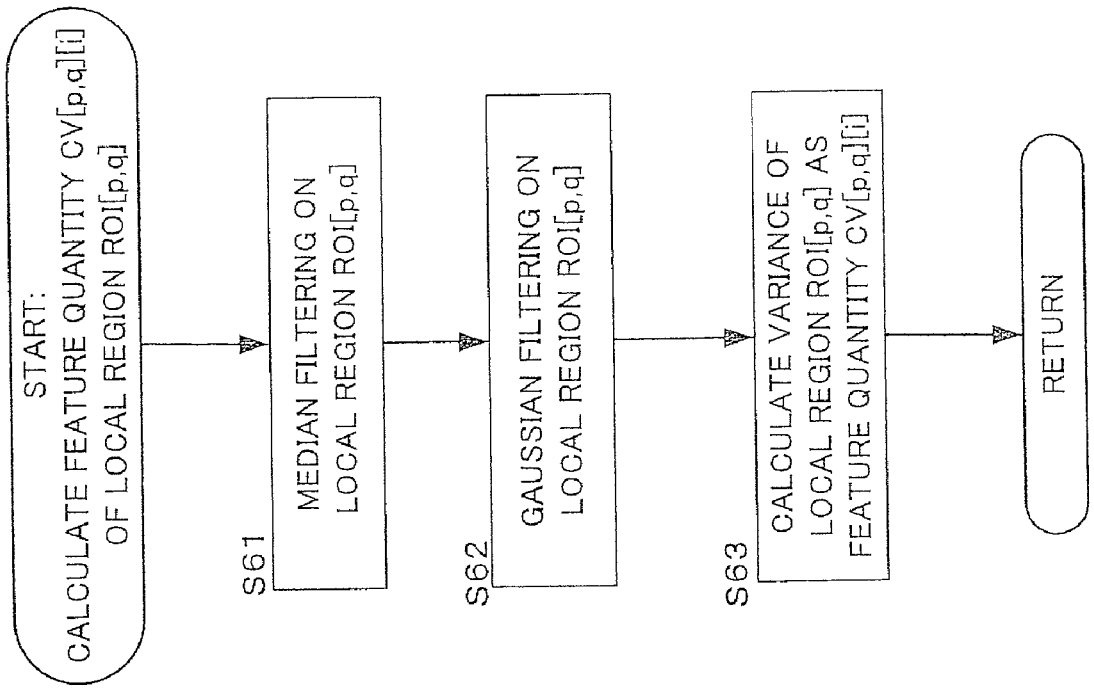
FIG. 7A is a flowchart showing calculation of feature quantity CV[p,q][i] of local region ROI[p,q]

Referring to FIGS. 7A to 7D, the following will describe the calculation of the feature quantity CV[p,q] of the local region ROI[p,q] in step S34. FIG. 7A is a flowchart showing the calculation of the feature quantity CV[p,q][i] of the local region ROI[p,q].

Figure 7B:
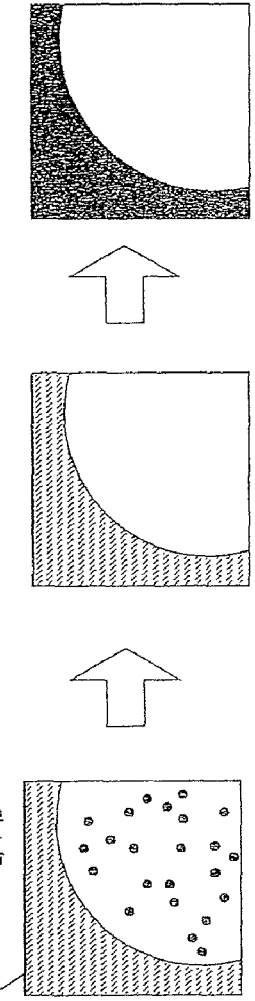
FIGS. 7B to 7D are explanatory drawings showing calculation of feature quantities of various local regions ROI.
Figure 7C:
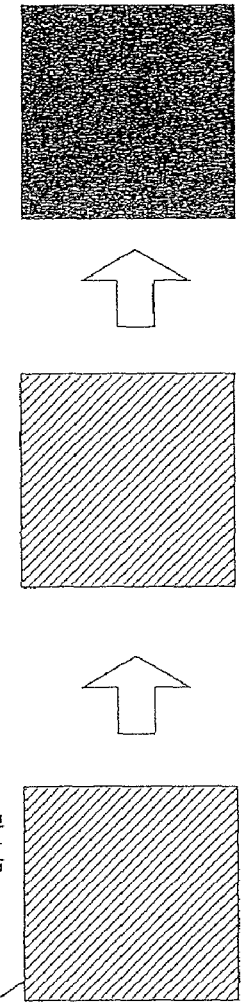
Figure 7D:
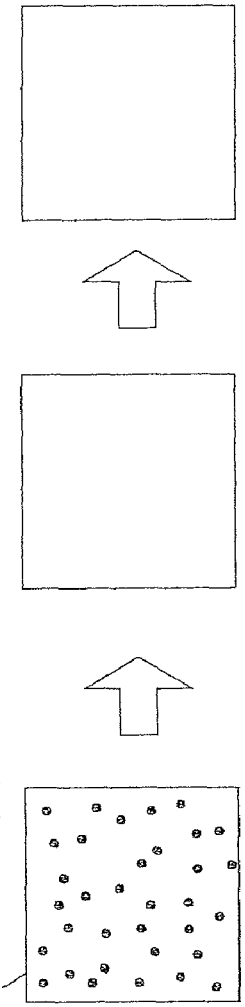

First, median filtering and Gaussian filtering are performed on the local region ROI[p,q] (steps S61 and S62). FIG. 7B is an explanatory drawing showing a filtering process of a relatively distinctive local region ROI[p,q] such as an contour of a target. The region includes, for example, an organ and tissue around the organ. FIGS. 7C and 7D are explanatory drawings showing a filtering process of a local region ROI[p,q] having no features. FIG. 7C shows, for example, entirely uniform muscular tissue which is a flat region or the like of a target. FIG. 7D shows, for example, a point (air) outside a target.

As shown in FIGS. 7B to 7D, median filter removes white noise on the local region ROI[p,q], and Gaussian filter removes structure including fibers so that the local region ROI[p,q]. Then, the filtered image is now suitable for obtaining feature quantity. It is therefore possible to prevent the indication of an excessively large feature quantity in a region having a fine structure including muscle fibers, as compared with the case where a variance is obtained without filtering.

And then, the variance of the local region ROI[p,q] is calculated as a feature quantity CV[p,q][i] and the processing is completed (step S63).

2-1-2 "Acquisition of a Distortion Amount Warp[z] on the Feature Point Z Relative to Each Image"

The following will discuss the acquisition of a distortion amount Warp[z][i] on the feature points Z1 and Z2 relative to each image in steps S47 and S49.

First, referring to FIGS. 8A to 8E and FIGS. 9A and 9B, the feature points will be discussed below. FIGS. 8A to 8E are explanatory drawings showing a feature of a distortion of a diffusion weighted image and FIGS. 9A and 9B are explanatory drawings showing the feature points.

FIG. 8A schematically shows an array Warp[p,q][i] which represents a distortion amount obtained in step S12. The array is divided by the grid width GW.

Distortion occurs along the direct on of the gradient field pulse. For example, as shown in FIG. 8B, a part of the image [i] is translated along the direction of the gradient field pulse or as shown in FIG. 8C, a part of the image[i] is scaled up or down along the direction of the gradient field pulse.

In other words, the distortion of the image is limited in the direction of the gradient field pulse. To be specific, distortion almost evenly occurs in the overall band like regions (FIG. 8D) divided along the direction of the gradient field pulse. For example, distortion shown in FIG. 8E does not occur in which a feature point has a different scaling rate in a single band like region. Therefore by acquiring distortion amounts on at least two points in a band like region, it is possible to uniquely determine, by the distortion amounts, a distortion amount of the overall band like region. Thus correction using the distortion amount of the overall band like region makes it possible to eliminate the distortion of the overall band like region. For this reason, two feature points Z are determined for each band like region (FIG. 9A) and distortion amounts Warp of the feature points Z are determined (FIG. 9B).

Referring to the flowchart of FIG. 10, the acquisition of the distortion amount Warp will be discussed below. FIG. 10 is a flowchart showing the acquisition of the distortion amount Warp[z][i] on the feature points Z1 and Z2 relative to each image. Processing on the feature point Z1 (processing from step S47) and processing on the feature point Z2 (processing from step S49) are similar to each other, and thus the feature points Z1 and Z2 will be simply referred to as "feature point Z" in the following explanation.

First, the local region ROI [z] is set around the feature point Z (step S71) (FIG. 11A).

Subsequently a value of variable i2 is set at i+1. The variable i2 indicates an image for which a relative distortion amount is obtained (step S72). In the case of i=n−1, i2 is set at 0. And then, in order to match the orientations of targets of the image [i] and the image [i2], the image [i2] is rotated by a value obtained by subtracting a direction Angle[i] of the gradient field pulse of the image [i1] from a direction Angle [i2] of the gradient field pulse of the image [i2] (step S73) (FIGS. 11A and 11B). As shown in FIGS. 11A and 11B, when the orientations of the targets on the images are matched, the directions of the gradient field pulses become different from each other.

Subsequently a search is made for a region matching with the local region ROI[z] on each image (FIG. 11C) and the distortion amount Warp[z][i] is obtained (step S74).

Figure 12:
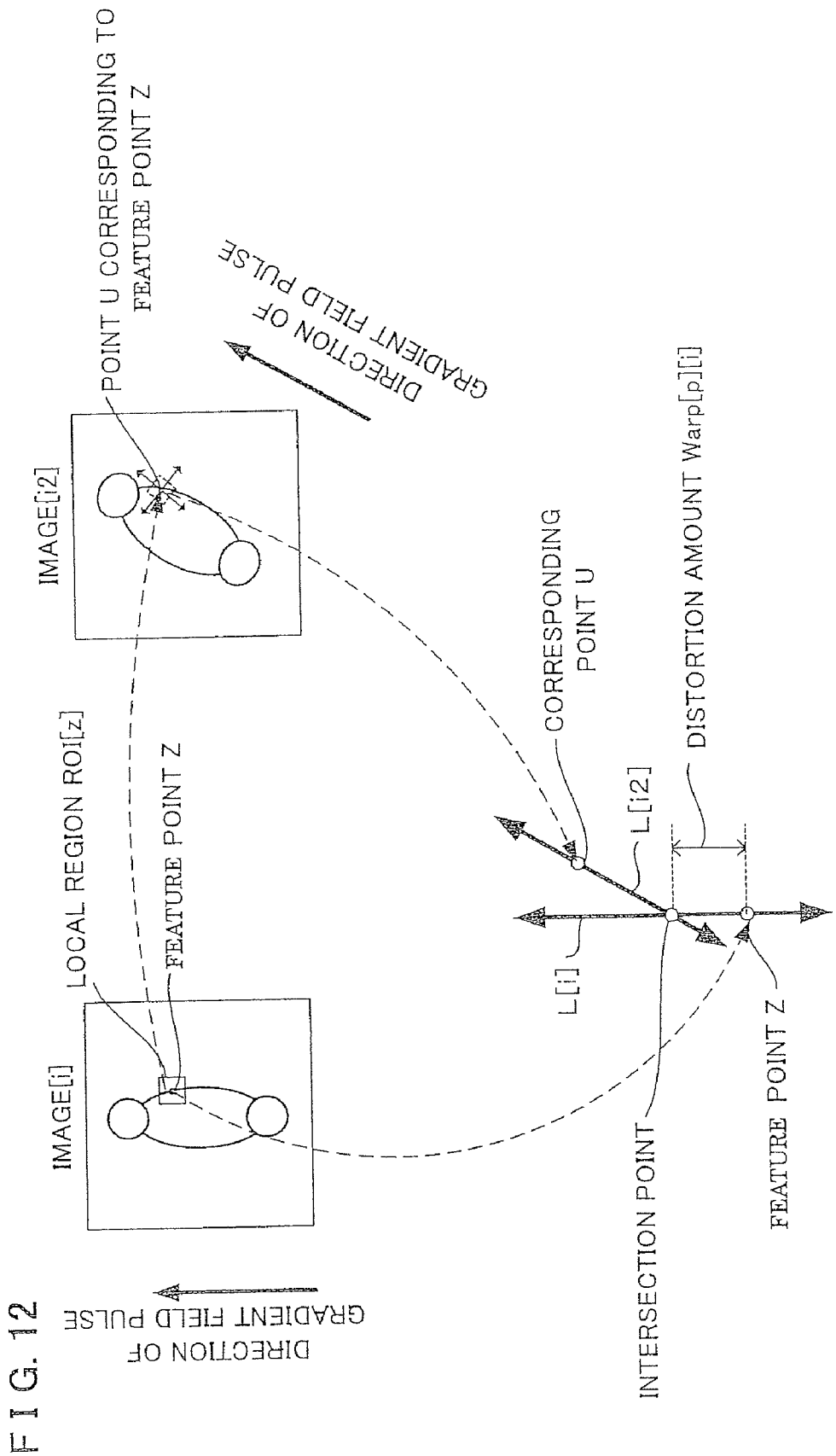
FIG. 12 is an explanatory drawing showing acquisition of distortion amounts Warp[z][i] on the feature points Z1 and Z2 relative to each image.

Referring to FIGS. 11C and 12, the acquisition of the distortion amount Warp[z][i] in step S74 will be specifically discussed below. FIGS. 11C and 12 show an example in which a distortion amount Warp[z][i] is obtained relative to the image[i2].

As shown in FIG. 11C, on the image[i2], a search is made by pattern matching for a point the most similar to the local region ROI[z] of the feature point Z on the image[i], so that a point U corresponding to the feature point Z is retrieved and obtained on the image [i2]. In this case, it is efficient to start a search, on the image [i2], from a location having variables p and q for specifying a same region as the region including the feature point Z. Thus as shown in FIG. 12, the corresponding points on the two images can be linked to each other.

Subsequently a distortion amount Warp[z][i] of the feature point Z on the image[i] is determined relative to the point U on the searched image[i2].

As shown in FIG. 12, first, an intersection point is determined for a straight line L[i] passing through the feature point Z in parallel with the direction of the gradient field pulse of the image[i] and a straight line L[i2] passing through the point U, which corresponds to the feature point Z, on the image[i2] in parallel with the direction of the gradient field pulse of the image [i2] And then, a distance between the intersection point and the feature point Z is obtained as the distortion amount Warp[z][i] of the feature point Z.

As described above, in step S47, on all the feature points Z1 on the image[i], the distortion amounts Warp[z][i] of the feature points Z1 are obtained relative to each image, and then the processing of step S47 is completed. In step S49, on all the feature points Z2 on the image[i], the distortion amounts Warp[Z2][i] of the feature points Z2 are obtained relative to each image, and then the processing of step S49 is completed.

2-2. Abnormality Detection and Interpolation of the Distortion Amount Warp[i]

Referring to FIGS. 13A to 13C and FIGS. 14A and 14B, the following will specifically discuss abnormality detection and interpolation of the distortion amount Warp[i] in steps S16 and S17.

FIG. 13A schematically shows an array Warp[p,q][i] representing the distortion amount obtained in step S12. FIG. 13B schematically shows the distortion amount Warp[z][i] obtained on the feature point Z in step S15. The distortion amount Warp[z][i] is expressed like the array.

When an unnatural point is present, for example, when a point on the image[i] is distorted so as to shrink along the direction of the gradient field pulse as shown in FIG. 13B and the arrays of distortion amounts Warp[z][i] on the feature points Z cross each other, the feature point Z is regarded as being abnormal and deleted. Interpolation is performed on the distortion amount Warp[z][i] of the deleted feature point Z and distortion amounts Warp[z][i] on points other than the feature point Z (FIG. 13C).

Figure 14B:
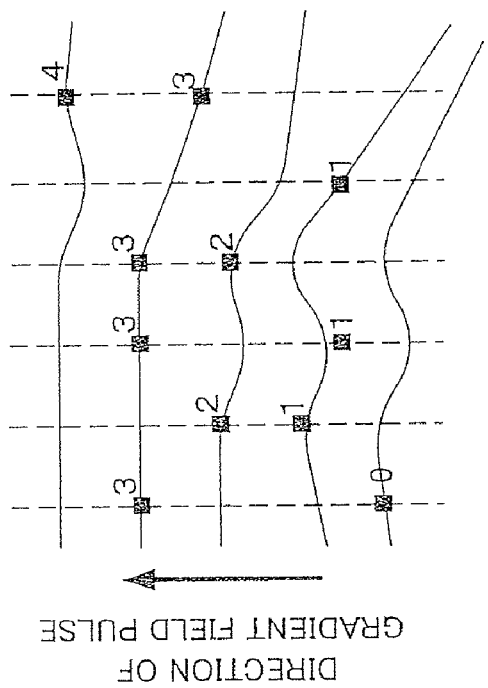
FIGS. 14A and 14B are explanatory drawings showing interpolation of distortion amounts Warp[p,q][i]
Figure 14A:
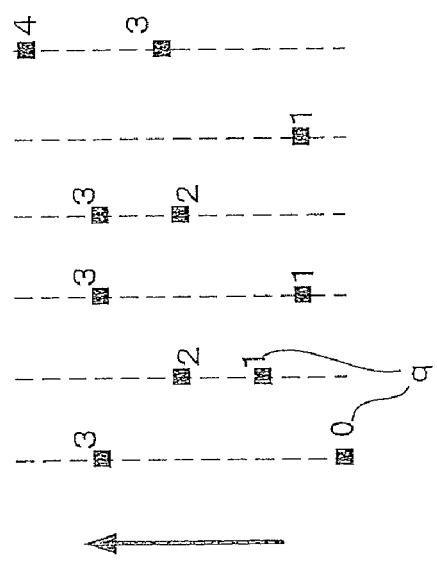

Referring to FIGS. 14A and 14B, the interpolation of step S17 will be discussed below. FIGS. 14A and 14B are explanatory drawings showing interpolation performed on the distortion amount Warp [z][i] of the feature point Z having been deleted by abnormality detection and the distortion amounts Warp[p,q][i] of local regions [p,q] other than the feature point Z.

As shown in FIG. 14A, only elements corresponding to the feature points Z are calculated and thus distortion amounts Warp[p,q] are sparsely present. The feature points are represented as "■". The subscript of the feature point Z is the subscript q (0 to 3) of the matched distortion amount Warp[p,q]. The value of the distortion amount Warp[p,q] represents a distortion amount in the direction of the gradient field pulse. Each of the band like regions includes two feature points Z, and the point where abnormality is detected has been deleted in step S16.

In this case, by acquiring distortion amounts on at least two points in the band like region, it is possible to uniquely determine, by the distortion amounts, a distortion amount of the overall band like region. Thus as shown in FIG. 14B, a distortion amount in the direction of the gradient field pulse is determined using two points where information has been obtained. Further, arrays with the same q coordinate values are linked to one another, so that elements not having the values of the distortion amount Warp[p,q] can be interpolated. Therefore, in all the regions of the image[i], distortion amounts Warp[p,q][i] can be obtained relative to the other images, strictly saying, the other images defined by the variable i (e.g., image[i+1]) in step S14 or S18.

In steps S18 and S19, for all the images [i] ($0 \leq i \leq n$) having been obtained in step S11, distortion amounts Warp[i] are obtained relative to all the other images. Thereafter, superimposition is performed in step S20.

2-3. Abnormality Detection and Interpolation of the Distortion Amount Warp[i]

Figure 15:
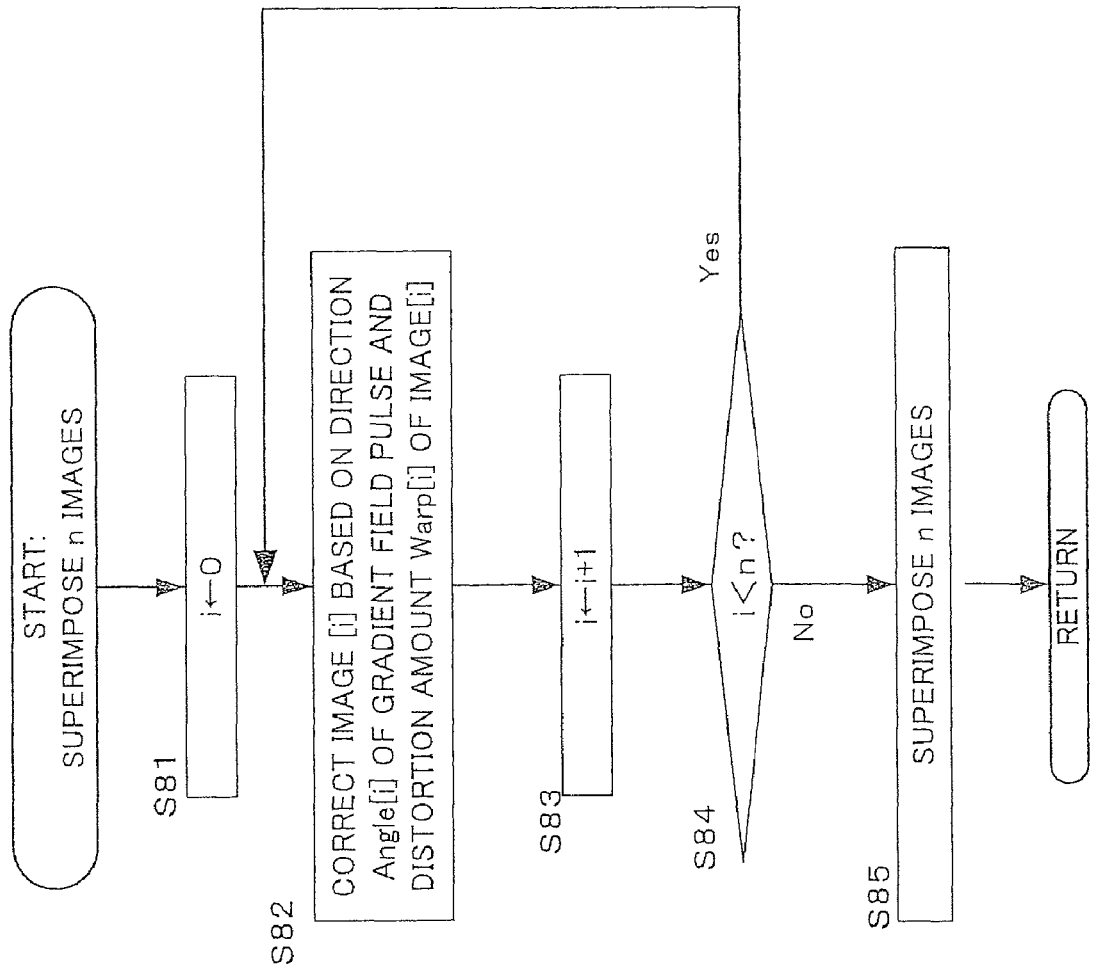
FIG. 15 is a flowchart showing superimposition of n images.

Referring to the flowchart of FIG. 15, the following will discuss "superimposition of n images" in step S20. FIG. 15 is a flowchart showing "superimposition of n images".

First, the variable i is reset to 0 (step S81) and the image[i] is corrected based on the direction Angle[i] of the gradient field pulse of the image[i] and the distortion amounts Warp[i] of the image[i] relative to the other images (step S82). The direction Angle[i] has been obtained in step S13 and the distortion amount Warp[i] has been obtained in steps S15 to S19. And then, the variable i is increased by 1 (step S83) and it is decided whether the variable i is smaller than the n images having been first obtained in step S11 (Step S84). When the variable i is smaller (Step S84: Yes), there are still images to be corrected. Thus the process returns to step S82 and the subsequent image is corrected. When the variable i is equal to or larger than n (step S84: No), the process advances to step S85.

Subsequently the corrected n images are superimposed (fusion) to generate a composite image, and then the processing is completed (step S85). The generated composite image can be displayed on the display unit 14 and presented to an operator such as a doctor, or the composite image can be outputted through the output unit of a printer or the like (not shown).

3. Embodiment 3 of Image Processing

Embodiment 3 of image processing will be discussed below.

Figure 16:
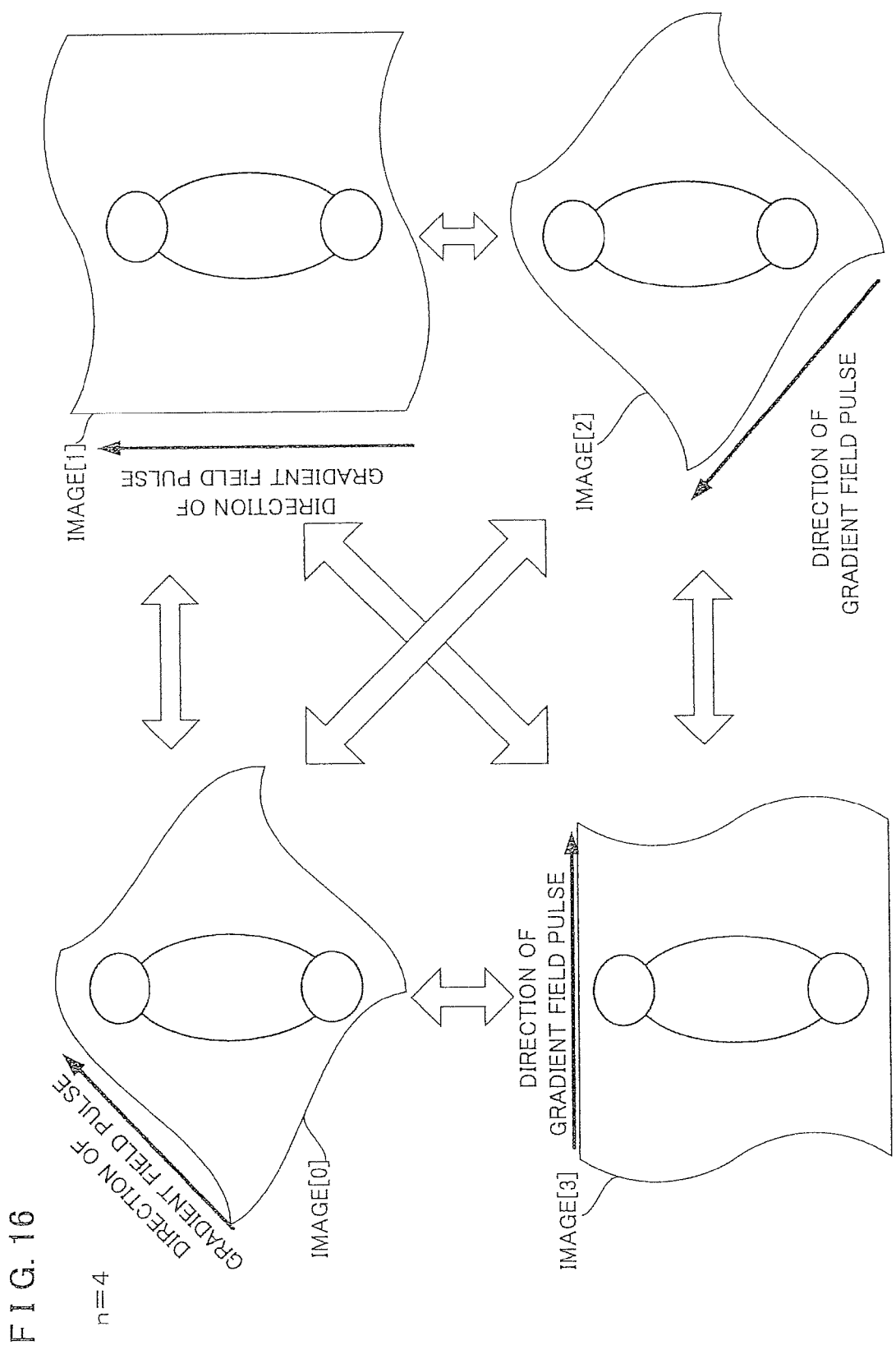
FIG. 16 is an explanatory drawing showing mutual correction of four images.
Figure 17:
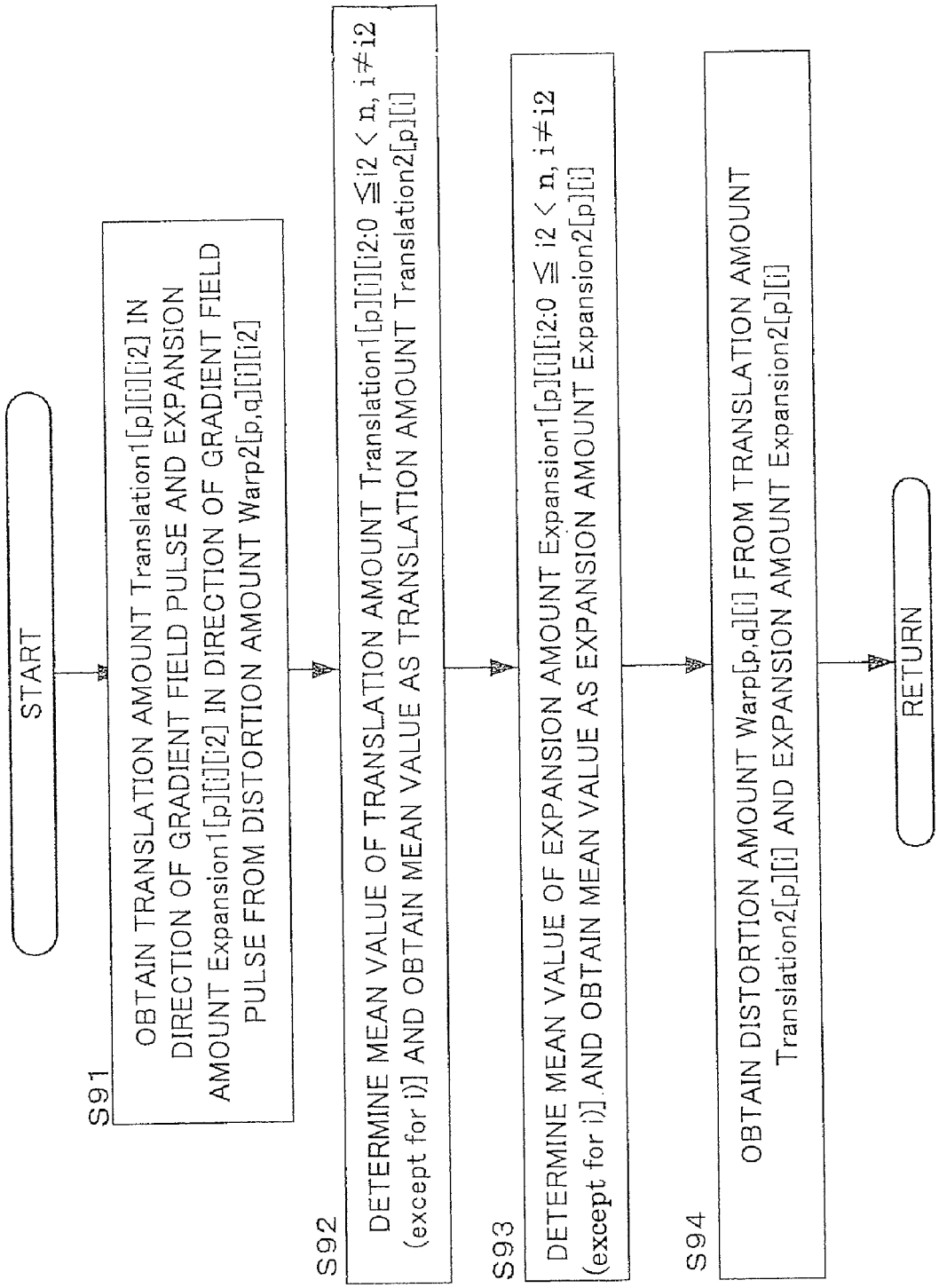
FIG. 17 is a flowchart showing acquisition of distortion amount Warp according to Embodiment 3 of image processing.

In Embodiment 2 of image processing, local regions on one image correspond to regions on the other images and the corresponding regions are sequentially searched by pattern matching. For example, as shown in FIG. 16, although two or more images (four images (n=4) in FIG. 16) are corrected to one another, one image just refers to one of the other images (image i refers to image i+1).

In the present embodiment, one image refers to all the other images, so that a distortion is corrected with higher accuracy. In other words, in the present embodiment, all the images other than the image i are searched for a distortion amount Warp. The distortion amount is represented as a distortion amount Warp2[$i$][i2]($i \neq i2$) which is obtained when the image i refers to the image i2. A distortion amount Warp[p,q][i] represents a distortion amount of the image i relative to an undistorted image. Where, the distortion amount is calculated using the other distorted image i2. For this reason, when distortion amount is calculated relative to two or more images i2 for comparison, the calculated distortion amount of the image i may be different for each image i2 due to an error or the like of the apparatus. The present embodiment aims to absorb the difference in the distortion amount calculated by comparison. Embodiment 2 of image processing corresponds to a specific case of the present embodiment where only the distortion amount Warp2[$p,q$][i][i+1] is used for calculation. The configuration and function of the diffusion weighted image processing apparatus 1, for example, the steps of obtaining the value of the distortion amount Warp2 are similar to those of Embodiment 2 of image processing except that two or more calculations are performed on every two images in a configuration for obtaining a value of the distortion amount Warp, and thus the detailed explanation thereof is omitted.

The following will discuss the acquisition of the distortion amount Warp [p,q][i] of the image i relative to all the other images according to the present embodiment. A diffusion weighted image is distorted so as to be translated, sheared, and scaled up or down in one direction. Thus distortion amounts Warp [p,q][i] of the image i relative to all the other images can be obtained by determining an amount of translation in a direction of a gradient field pulse and an amount of expansion in the direction of the gradient field pulse. A direction of distortion caused by the gradient field pulse is represented as q direction.

First, based on a distortion amount Warp2 [p,q][i2] of the image i relative to the image i2 ($0 \leq i2 < n$, $i \neq i2$), a translation amount Translation1[$p$][i][i2] in the direction of the gradient field pulse and an expansion amount Expansion1[$p$][i][i2] in the direction of the gradient field pulse are obtained (step S91). The relationship of the distortion amount Warp2[$p,q$][i2], the translation amount Translation1[$p$][i][i2], and the expansion amount Expansion1[$p$][i][i2] is expressed in Equation 1 below:

$$\text{Warp2}[p,q][i][i2] = \text{Expansion1}[p][i][i2] \times q + \text{Translation1}[p][i][i2]$$ (Equation 1)

Subsequently a mean value of translation amounts Translation1[p][i][i2(0≦i2<n, i≠i2)] relative to the other images i2(0≦i2<0) and a mean value of expansion amounts Expansion1[p][i][i2(0≦i2<n, i≠i2)] are obtained as a translation amount Translation2[p][i] and an expansion amount Expansion2[p][i], respectively (steps S92 and S93).

And then, based on the obtained translation amount Translation2[p][i] and expansion amount Expansion2[p][i], distortion amounts Warp[p,q][i] of the image i relative to all the other images are obtained according to Equation 2 below and the processing is completed (step S94).

Warp[p,q][i]=Expansion2[p][i]×q+Translation2[p][i]   (Equation 2)

The processing of steps S91 to S94 is repeatedly performed on all the images other than the image i, so that a distortion amount Warp[p,q][i] can be obtained for each of the images other than image i.

4. Embodiment 4 of Image Processing

Embodiment 4 of image processing will be discussed below. Even in Embodiments 1 to 3 of image processing, a stable correction may be hampered by an image of poor quality and a considerable distortion. The present embodiment aims to stably correct distortion by limiting the degree of freedom of distortion.

Distortion to be corrected in Embodiments 1 to 3 of image processing occurs so as to be translated, sheared, and scaled up or down in one direction. Thus the distortion only has two degrees of freedom, which is translation and scaling up or down in a direction of a gradient field pulse. Therefore a distortion represented as Warp[p,q][i] can be indicated as a combination of a translation amount Translation3[p][i] in the direction of the gradient field pulse and an expansion amount Expansion3[p][i] in the direction of the gradient field pulse.

The translation amount Translation3[p][i] and the expansion amount Expansion3[p][i] can be also interpreted as a translation amount Translation4[p][i] and an expansion amount Expansion4[p][i] each of which is a piecewise-continuous function as a function of p. Thus the Translation4(p)[i] and the Expansion4(p)[i] are each approximated to a cubic function $F(a \times p^3 + b \times p^2 + c \times p + d)[i]$. A least square approximation is preferably used for this approximation. Further, the function for approximation is not limited to the cubic function. For example, a spline curve, a quadratic function, and so on may be used as long as the functions are easily represented.

In approximating the piecewise-continuous function to the cubic function F, instead of minimizing a degree of difference between the piecewise-continuous function and the cubic function F, a degree of difference may be minimized for i to (n−1) images having undergone distortion correction. Such a degree of difference can be determined by, for example, a root sum of the pixels of difference images.

According to the above embodiment, it is possible to correct distortions caused by gradient field pulses on images (diffusion weighted images) and obtain a composite image made up of a desired number of images (diffusion weighted images) requiring smaller endurance on a patient.

According to the above embodiment, a feature resulted from the imaging conditions of images is image enhancement based on dispersion of water molecules depending upon a direction of a gradient field pulse. The present invention is not limited to the image enhancement but is applicable to any case where it is necessary to observe (analyze) the features of various images having been distorted with anisotropy due to imaging conditions, as a composite image made up by superimposing the images.

Further, programs corresponding to the flowcharts of FIGS. 2, 4, 5, 7A, 10, 15 and 17 are recorded in an information recording medium such as a flexible disk or a hard disk or acquired and recorded through the Internet or the like, and the programs are read and run by a general-purpose computer, so that the computer can be caused to act as the control unit 11 of the embodiments.

As described above, the present invention is applicable to the fields of diagnostic imaging and image analysis in which a composite image obtained by superimposing (fusion) two or more diffusion weighted images is used, the diffusion weighted images having been obtained by diffusion weighted imaging. Particularly the present invention is quite effective in the field of analysis of a composite image made up of two or more diffusion weighted images with different gradient field pulses.

The present invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2006-81575, filed on Mar. 23, 2006, including the specification, claims, drawings and summary are incorporated herein by reference in its entirety.

What is claimed is:

1. A diffusion weighted image processing apparatus, comprising a dividing device configured to divide a diffusion weighted image into two or more band like regions along a direction of a gradient field pulse, and a correcting device configured to relatively correct, with mutual reference among two or more diffusion weighted images that include the diffusion weighted image and have different directions of gradient field pulses during imaging, distortions occurring in the directions of the gradient field pulses, the distortion being caused at least in part by the gradient field pulse of the diffusion weighted image and being determined in each of the two or more band like regions.

2. The diffusion weighted image processing apparatus according to claim 1,
   wherein the dividing device is further configured to divide at least one of the band like regions into two or more divided regions,
   further comprising a searching device configured to search for, by pattern matching, at least two or more divided regions in each of the band like regions and regions corresponding to the divided regions on another diffusion weighted image, and
   wherein the correcting device is further configured to refer to the corresponding regions and correct the divided regions of the diffusion weighted image based on the directions of the gradient field pulses of the diffusion weighted image and the other diffusion weighted image.

3. The diffusion weighted image processing apparatus according to claim 1,
   further comprising a feature point determining device configured to determine at least two feature points representing features of the diffusion weighted image in each of the band like regions of the diffusion weighted image, and a corresponding point obtaining device configured to search for, by pattern matching on another diffusion weighted image, a region corresponding to a local region around the feature point, and obtain a point in the corresponding region as a corresponding point of the feature point, and wherein the correcting device is further configured to correct at least one of the feature points based on a position coordinate of the corresponding point and the directions of the gradient field pulses of the diffusion weighted image and the other diffusion weighted image, and correct regions other than the band like region including the feature points of the diffusion weighted image by using at least one corrected feature point.

4. The diffusion weighted image processing apparatus according to claim 1,
further comprising a feature point determining device configured to determine at least two feature points representing the features of the image in each of the band like regions of the diffusion weighted image, a corresponding point obtaining device configured to search for a region corresponding to a local region around the feature point by pattern matching on another diffusion weighted image and obtain a point on the found corresponding region as a corresponding point of the feature point, and a feature point distortion amount obtaining device configured to obtain a distortion amount for each of the feature points based on a position coordinate of the corresponding point and the directions of the gradient field pulses of the diffusion weighted image and the other diffusion weighted image,
wherein the correcting device is further configured to correct the diffusion weighted image for each of the band like regions by using the distortion amount of the feature point belonging to the band like region.

5. The diffusion weighted image processing apparatus according to claim 1, further comprising a superimposing device configured to generate a composite image by superimposing the diffusion weighted images having been corrected by the correcting device.

6. The diffusion weighted image processing apparatus according to claim 1, wherein the diffusion weighted image has a feature resulting from the gradient field pulse and the feature is image enhanced based on anisotropy of dispersion of a water molecule.

7. A non-transitory recording medium encoded with executable instructions readable by a computer and configured to cause the computer to perform operations comprising dividing a diffusion weighted image into two or more band like regions along a direction of a gradient field pulse, and relatively correcting, with mutual reference among two or more diffusion weighted images that include the diffusion weighted image and have different directions of gradient field pulses during imaging, distortions occurring in the directions of the gradient field pulses, the distortion being caused at least in part by the gradient field pulse of the diffusion weighted images and being determined in each of the two or more band like regions.

8. The non-transitory recording medium according to claim 7, wherein the operations further comprise:
further dividing at least one of the band like regions into two or more divided regions,
searching for, by pattern matching, at least two or more divided regions in each of the band like regions and regions corresponding to the divided regions on another diffusion weighted image,
referring to the corresponding regions and correcting the divided regions of the diffusion weighted image based on the directions of the gradient field pulses of the diffusion weighted image and the other diffusion weighted image, and
correcting regions other than the band like region including the feature points of the diffusion weighted image by using the corrected feature points.

9. The non-transitory recording medium according to claim 7, wherein the operations further comprise:
determining at least two feature points representing features of the diffusion weighted image in each of the band like regions of the diffusion weighted image,
searching, by pattern matching on another diffusion weighted image, for a region corresponding to a local region around at least one of the feature points, and obtaining a point in the corresponding region as a corresponding point of the feature point, and
correcting device to correcting at least one of the feature points based on a position coordinate of the corresponding point and the directions of the gradient field pulses of the diffusion weighted image and the other diffusion weighted image.

10. The non-transitory recording medium according to claim 7, wherein the operations further comprise:
determining device for determining at least two feature points representing features of the diffusion weighted image in each of the band like regions of the diffusion weighted image,
searching, by pattern matching on another diffusion weighted image, for a region corresponding to a local region around at least one of the feature points, and obtaining a point on the corresponding region as a corresponding point of the at least one feature point,
obtaining device for obtaining a distortion amount for each of the feature points based on a position coordinate of the corresponding point and the directions of the gradient field pulses of the diffusion weighted image and the other diffusion weighted image, and
correcting each of the band like regions by using the distortion amount of the feature point belonging to the band like region.

11. The non-transitory recording medium according to claim 7, wherein the operations further comprise: generating a composite image by superimposing the corrected diffusion weighted images.

12. The non-transitory recording medium according to claim 7, wherein the diffusion weighted image has a feature resulting from the gradient field pulse and the feature is image enhanced based on anisotropy of dispersion of a water molecule.

13. A non-transitory recording medium encoded with executable instructions readable by a computer and configured to cause the computer to perform operations comprising:
dividing a diffusion weighted image into at least two regions, each of the at least two regions being oriented parallel to a direction of a gradient field pulse used to generate the diffusion weighted image, calculating a distortion amount for each of the at least two regions, and correcting the diffusion weighted image based on the distortion amounts.

14. The non-transitory recording medium according to claim 13 wherein said calculating operation includes searching for locations in another diffusion weighted image that corresponds to locations in the diffusion weighted image and comparing the locations in the another diffusion weighted image with the locations in the diffusion weighted image.

15. The non-transitory recording medium according to claim 14, wherein said locations in the locations in the another diffusion weighted image and said locations in the diffusion weighted image each include feature points.

16. The non-transitory recording medium according to claim 15, wherein said feature points are located along an edge of a feature of the diffusion weighted image.

17. The non-transitory recording medium according to claim 13, wherein said calculating operation includes calculating an array based on the distortion amounts.

18. The non-transitory recording medium according to claim 13, wherein said operations further comprise interpolating at least one of the distortion amounts across at least one of the at least two regions.

19. The non-transitory recording medium according to claim 13, wherein said operations further comprise identifying another direction of a gradient field pulse used to generate another diffusion weighted image having at least two regions, rotating the another diffusion weighted image such that the direction aligns with the another direction, and searching for correspondence between the at least two regions of the diffusion weighted image and the at least two regions of the another diffusion weighted image.

20. The non-transitory recording medium according to claim 13, wherein said correcting operation includes superimposing the diffusion weighted image over another diffusion weighted image.

* * * * *